(12) United States Patent
Rinkus

(10) Patent No.: US 8,983,884 B2
(45) Date of Patent: Mar. 17, 2015

(54) OVERCODING-AND-PARING: A BUFFERLESS CHUNKING PROCESS AND USES THEREOF

(76) Inventor: Gerard J. Rinkus, Newton, MA (US)

(*) Notice: Subject to any disclaimer, the term of this patent is extended or adjusted under 35 U.S.C. 154(b) by 931 days.

(21) Appl. No.: 12/848,401

(22) Filed: Aug. 2, 2010

(65) Prior Publication Data

US 2011/0047110 A1 Feb. 24, 2011

Related U.S. Application Data

(60) Provisional application No. 61/273,144, filed on Jul. 31, 2009.

(51) Int. Cl.
*G06E 1/00* (2006.01)
*G06N 3/02* (2006.01)

(52) U.S. Cl.
CPC ........................... *G06N 3/02* (2013.01)
USPC ............................................... 706/20; 706/16

(58) Field of Classification Search
CPC .................................. G06N 3/08; G06N 3/82
USPC .......................................................... 706/18
See application file for complete search history.

(56) References Cited

U.S. PATENT DOCUMENTS

| | | | | |
|---|---|---|---|---|
| 5,588,091 A | * | 12/1996 | Alkon et al. | 706/31 |
| 5,822,742 A | * | 10/1998 | Alkon et al. | 706/31 |
| 6,704,718 B2 | * | 3/2004 | Burges et al. | 706/21 |

OTHER PUBLICATIONS

Christopher J. Rozell, Don H. Johnson, Richard G. Baraniuk, and Bruno A. Olshausen. Sparse Coding via Thresholding and Local Competition in Neural Circuits. Neural Computation 2008 20:10, 2526-2563. Posted Online: Aug. 19, 2008.*

Patrik O Hoyer, Aapo Hyvärinen, A multi-layer sparse coding network learns contour coding from natural images, Vision Research, vol. 42, Issue 12, Jun. 2002, pp. 1593-1605, ISSN 0042-6989, 10.1016/S0042-6989(02)00017-2.*

Moll and Miikkulainen, "Convergence-Zone Episodic Memory: Analysis and Simulations," Tech. Report AI95-227 (University of Texas at Austin, Dept. of Computer Science (1995).

Rachkovskij and Kussul, "Binding and Normalization of Binary Sparse Distributed Representations by Context-Dependent Thinning," *Neural Comp.*, 13:411-452 (2001).

Rinkus, "A Combinatorial Neural Network Exhibiting Episodic and Semantic Memory Properties for Spatio-Temporal Patterns. Cognitive & Neural Systems," Boston, MA, Boston University. Ph.D. (1996).

(Continued)

*Primary Examiner* — Jeffrey A Gaffin
*Assistant Examiner* — David H Kim

(74) *Attorney, Agent, or Firm* — McCarter & English, LLP; Yu Lu

(57) ABSTRACT

The invention provides a computer-implemented chunking process (named "OP") to assign and physically associate unique spatial representations ("chunk codes") in one representational (coding) space ("chunk coding space") with unique temporal sequences of spatial codes ("items") in another coding space ("item coding space"). OP differs from all prior chunking processes in that, for any particular item sequence, it activates a unique chunk code for that sequence during presentation of that sequence's first item, even if other sequences from the input domain may begin with the same item.

19 Claims, 18 Drawing Sheets

(56) References Cited

OTHER PUBLICATIONS

Rinkus, "A cortical sparse distributed coding model linking mini- and macrocolumn-scale functionality," *Frontiers in Neuroanatomy*, 4(17):1-13 (2010).

Suemitsu and Morita, "Neural Network Model of Context-Dependent Neuronal Activity in Inferotemporal Cortex," 2006 IJCNN, 6 pages, Vancouver, BC, Canada (2006).

* cited by examiner

State Transition Probability Table

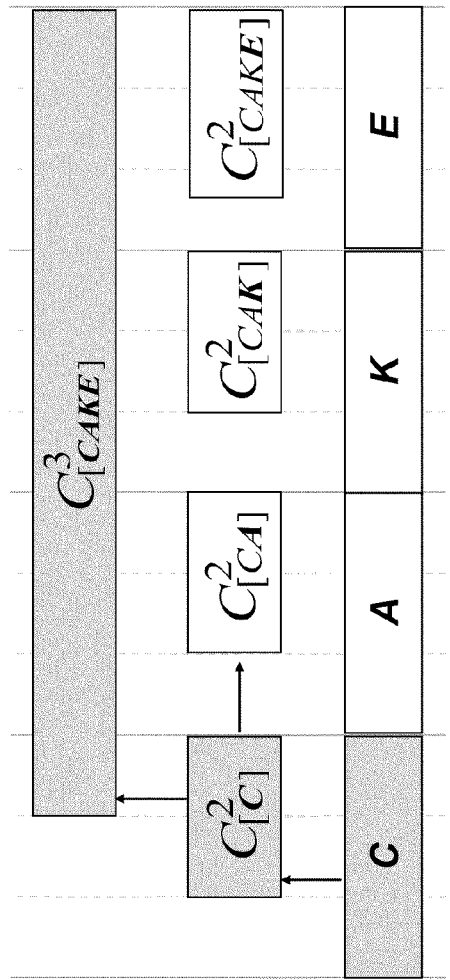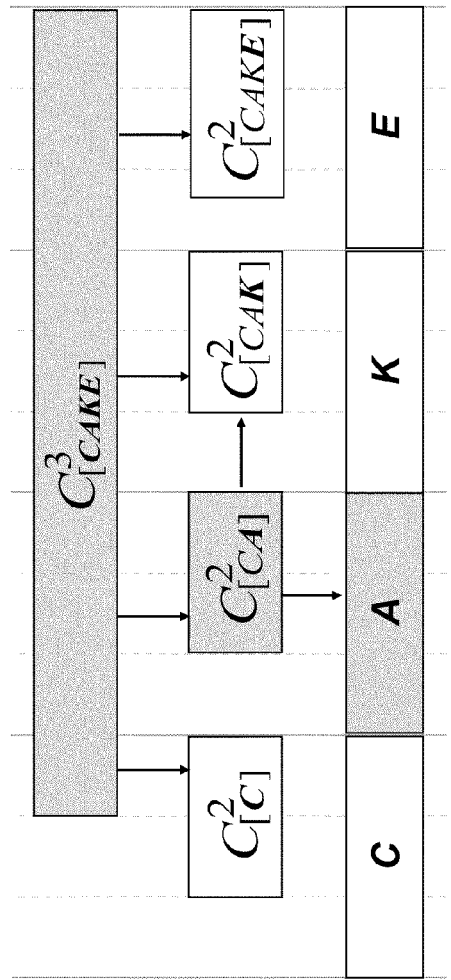
FIG. 3B-i
FIG. 3B-ii

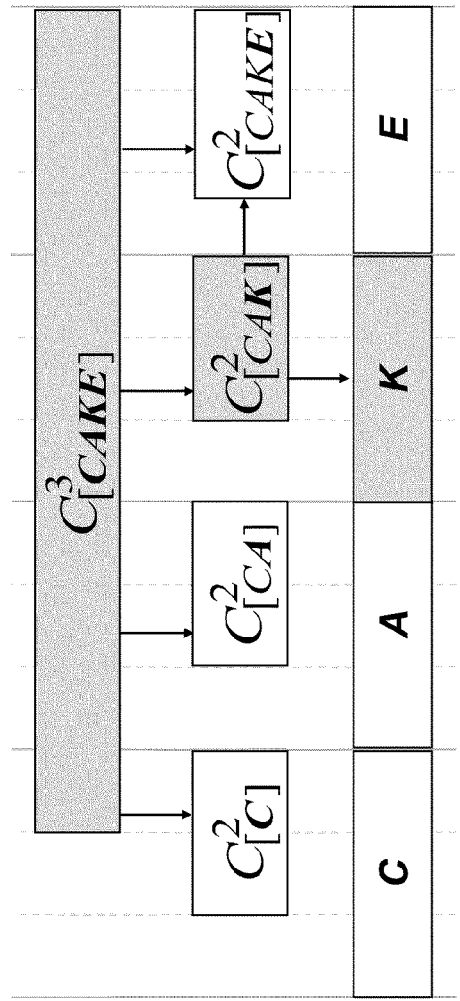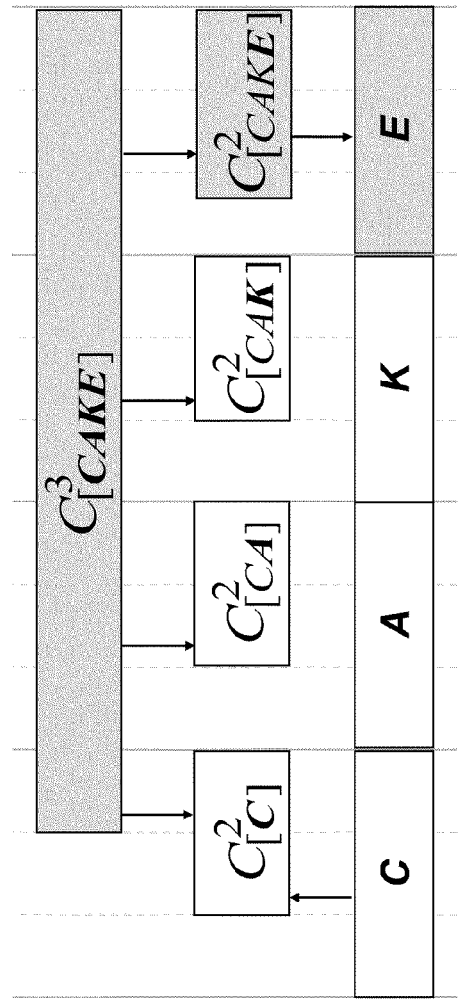

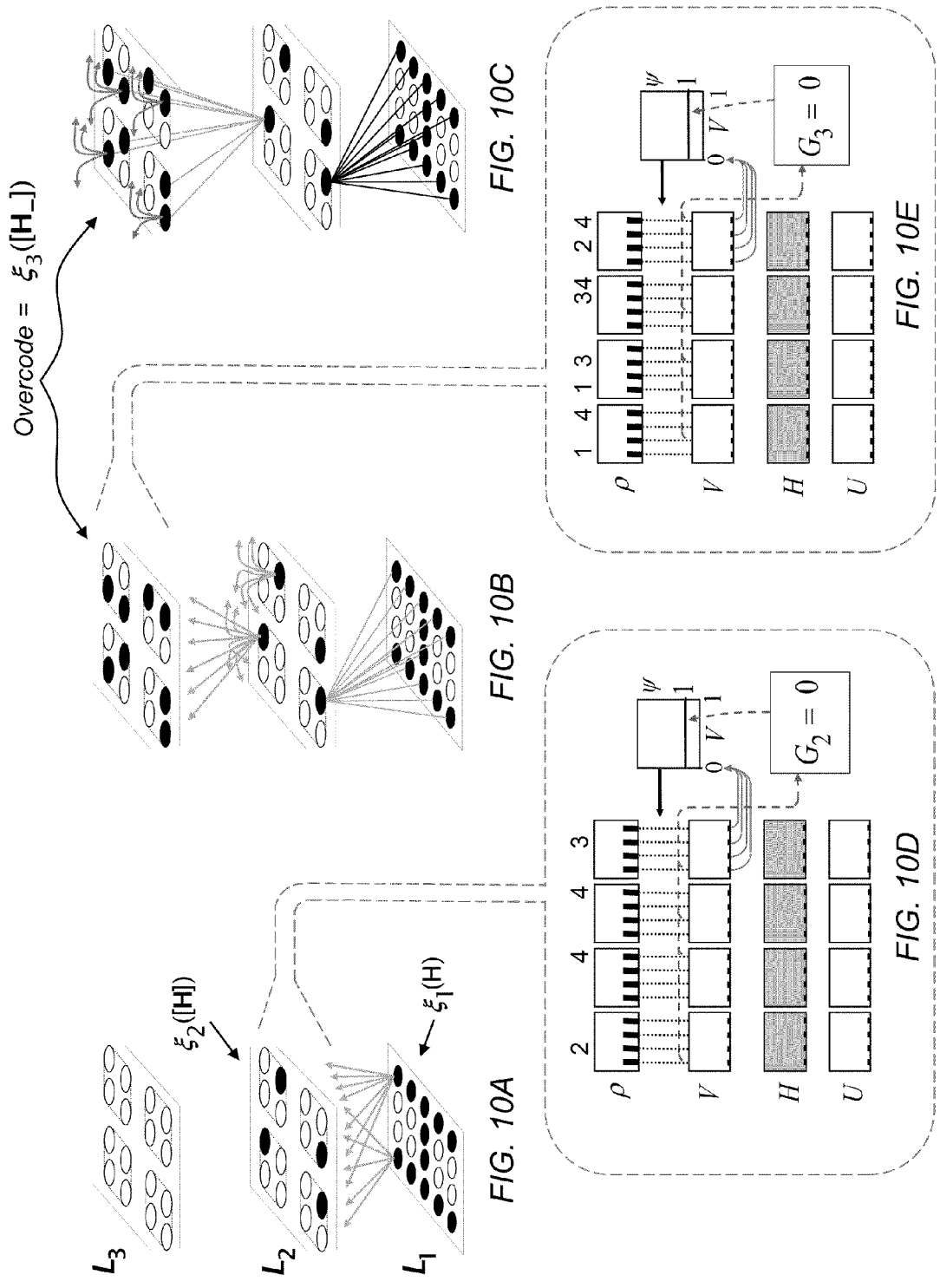

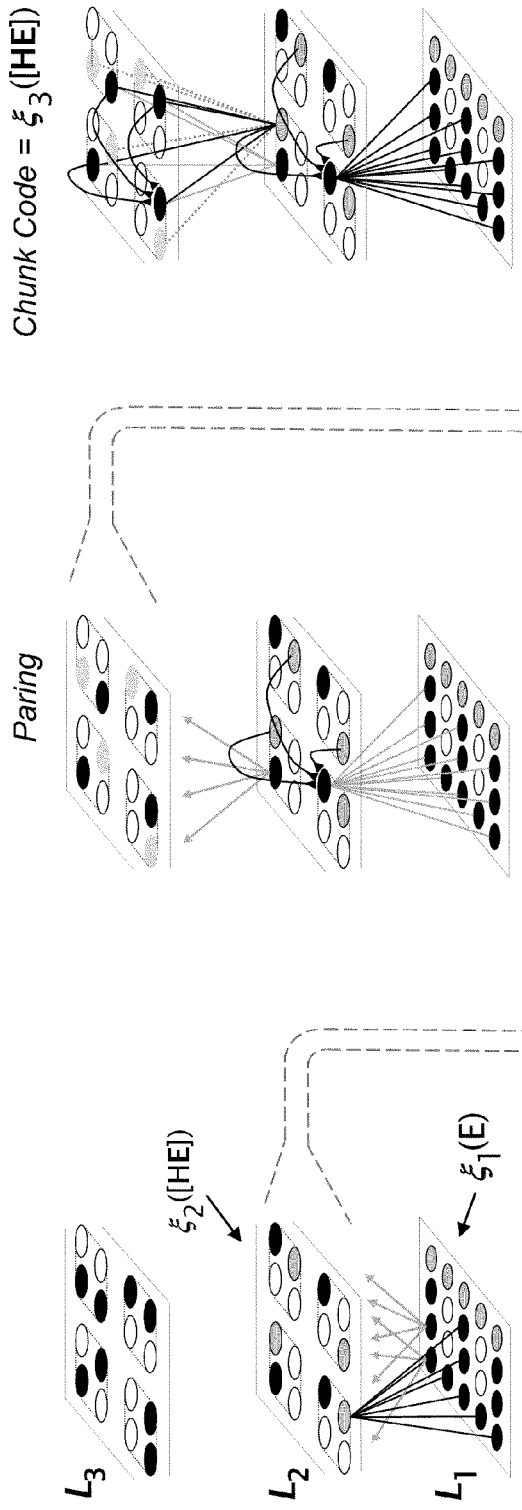
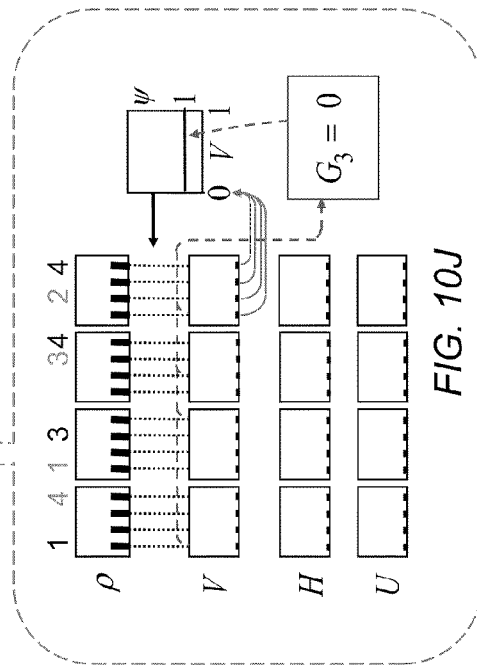
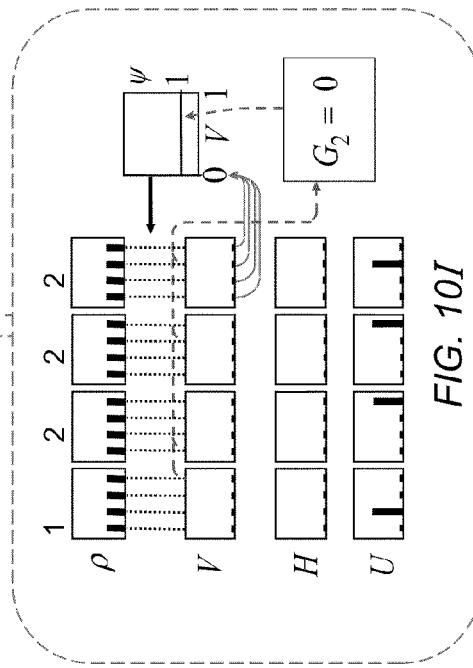
FIG. 10F
FIG. 10G
FIG. 10H
FIG. 10I
FIG. 10J

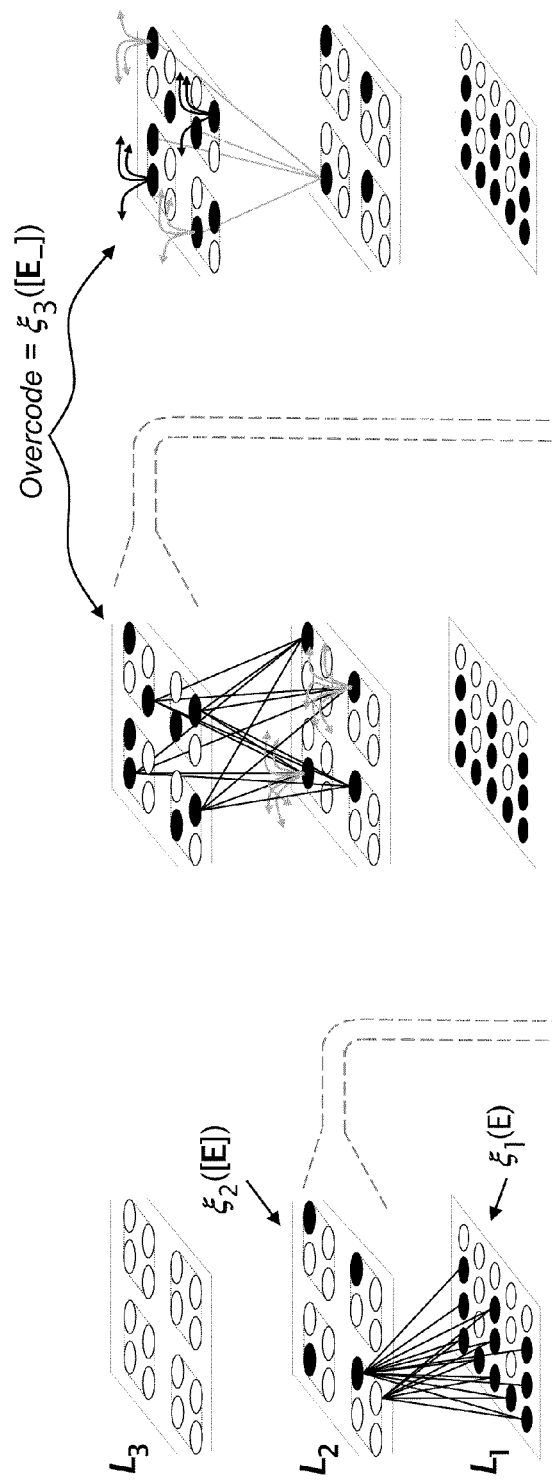
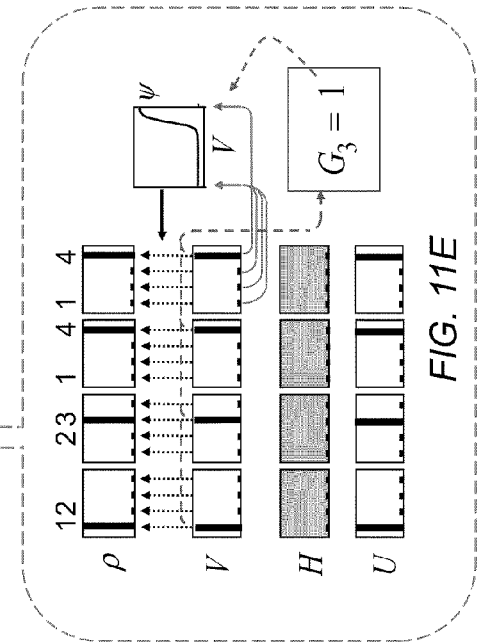
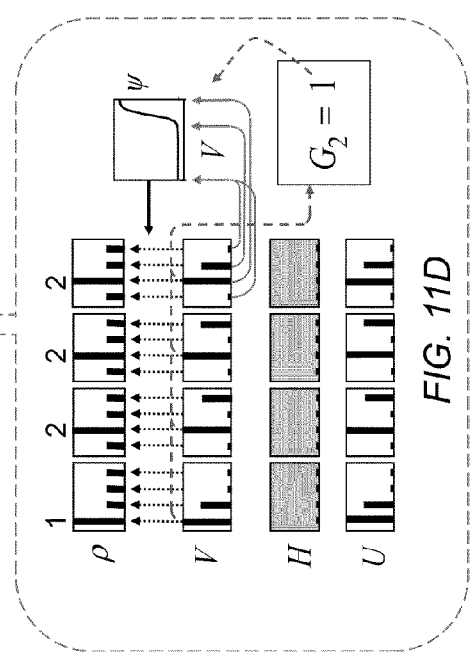

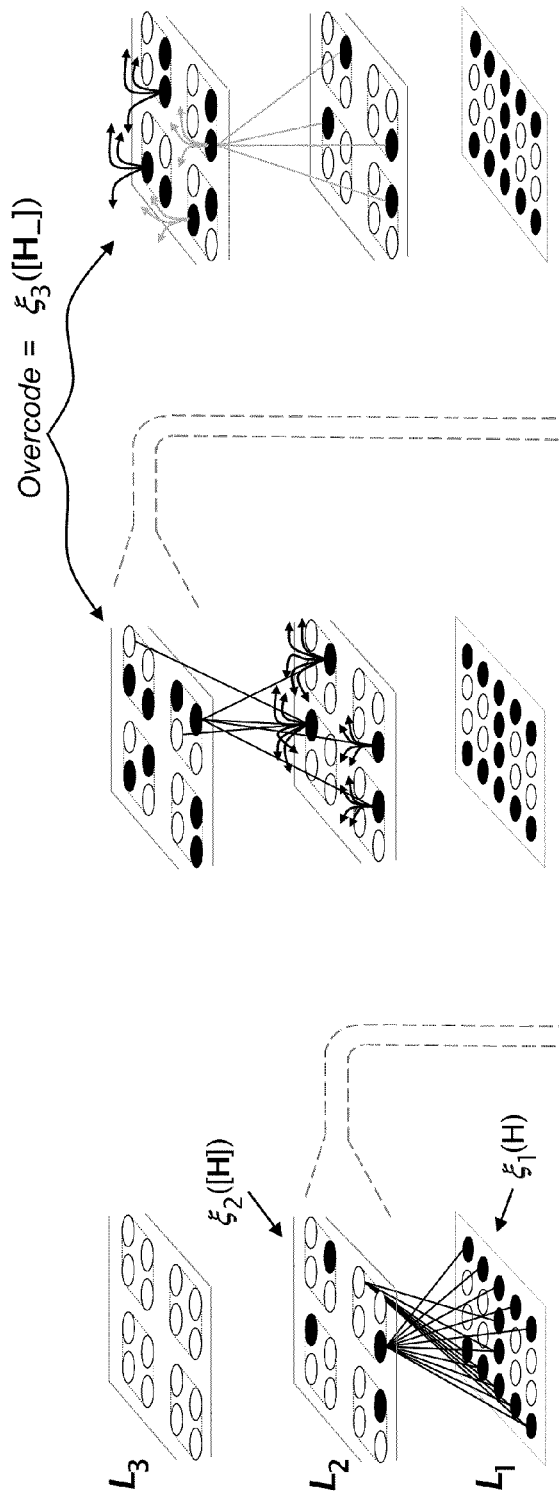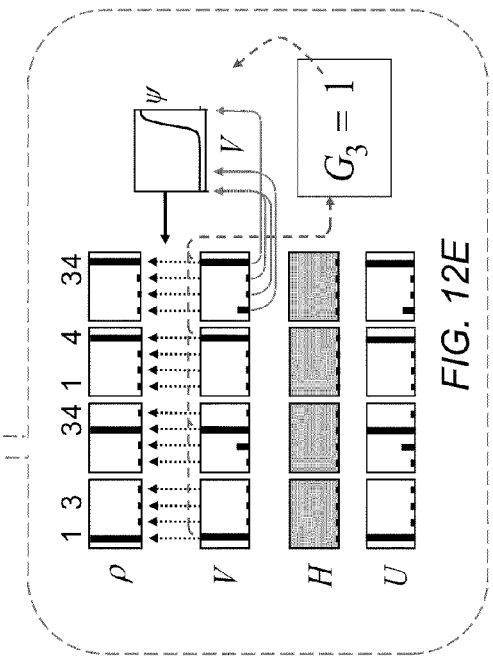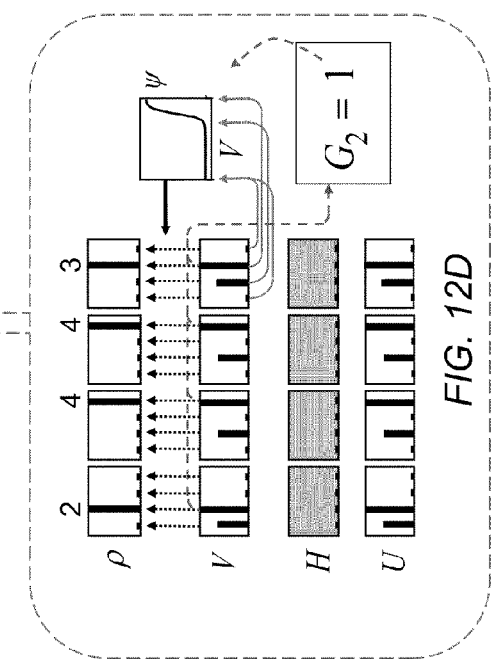

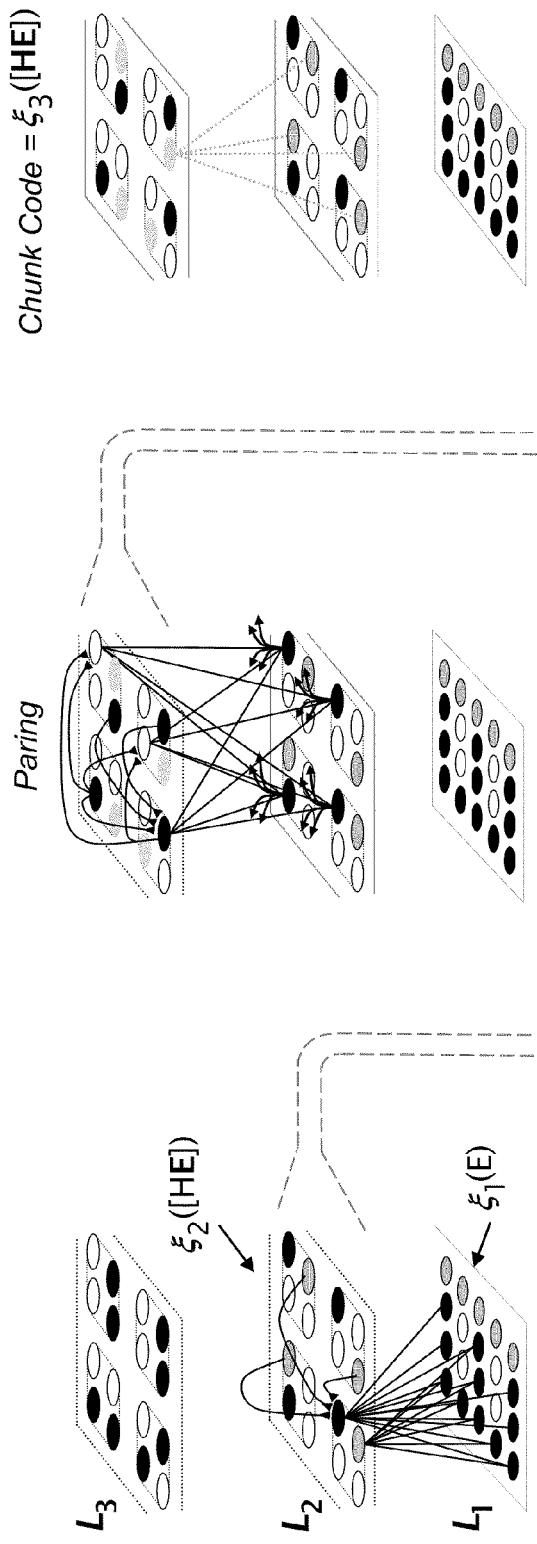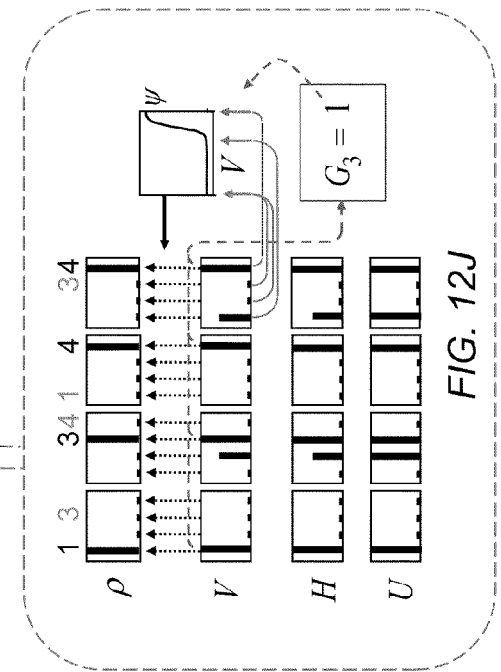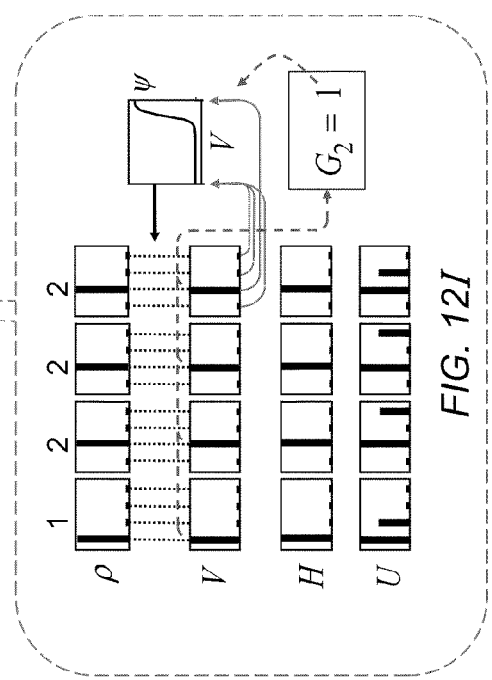
FIG. 12H
FIG. 12J
FIG. 12G
FIG. 12I
FIG. 12F

OVERCODING-AND-PARING: A BUFFERLESS CHUNKING PROCESS AND USES THEREOF

REFERENCE TO RELATED APPLICATION

This application claims the benefit of the filing date, under 35 U.S.C. 119(e), of U.S. Provisional Application No. 61/273,144, filed on Jul. 31, 2009, the entire content of which, including all the drawings thereof, are incorporated herein by reference.

GOVERNMENT SUPPORT

The invention described herein is partly supported by Grant No. 5 T32 NS07292 from the National Institute of Health (NIH). The U.S. Government has certain rights in this invention.

BACKGROUND OF THE INVENTION

Information about a domain is generally communicated and processed as sequences of items (e.g., bits, characters, words, frames of video). Information is present in both the individual items themselves and the order of the items ("TIP" has different meaning than "PIT").

Many sequence processing applications involve distinguishing sequences constructed from relatively small sets of items (e.g., "alphabets," "lexicons"). For example, all English spoken words can be represented as strings (sequences) over about 40 phonemes, all English text words, as strings over 26 letters, and all English sentences, and thus all English texts of any length (and thus all describable concepts), as strings over ~100,000 words. In such cases, individual items or sequences of items may typically occur numerous times across the domain, (e.g., "CHAT," "TACK," "KITE," "TRACK").

One principle for communicating and processing sequential information of this type faster and more efficiently is by finding item sub-sequences, i.e., item sequences that occur within longer sequences, which occur frequently in the domain and assigning a single code to represent them. This is an instance of the technique of "information compression." Borrowing a term from cognitive psychology (1), a single code (in a coding space) that represents a sequence of items (in an item space) may be referred to as a "chunk code" or simply "chunk," and the process of assigning a "chunk" to represent an item sequence and physically associating that chunk with the individual items comprising that sequence may be referred to as "chunking." In discussing or analyzing any particular instance/example of chunking, the sequence of items to which a chunk will be assigned/associated may be called the "items to be chunked."

Chunking is a process of information compression. In general, any information processing system which uses chunking will also need to manipulate the individual items represented by a chunk. The inverse process of obtaining the individual items from a chunk is called "unchunking." These correspond to the terms "packing" ("compressing") and "unpacking" ("uncompressing") used in the fields of communications and information processing.

It is essential to understand that the process of chunking is not simply a process for remembering item order. The class of machines which can simply remember item order is a super-set of the class of machines that do chunking. A simple finite state machine (FSA) (FIG. 1A), or hidden Markov model (HMM) (FIG. 1B), or recurrent neural network (2, 3) (FIG. 1C), which changes state as a function of which item is currently being input and what its current state is, remembers item order, because one can look at the current state and know the history (order), at least probabilistically, of inputs that led to it. But these machines, in and of themselves, do not create chunks, physically associate such chunks with the comprising items, or perform the operations of chunking and unchunking. The invention described herein below, called "overcoding-and-paring" (OP), is specifically a method and embodiment for chunking (packing, compressing) and unchunking (unpacking, uncompressing) information.

The chunking process (or "chunk assignment process") can be decomposed into at least three component processes.

First, selecting, choosing, or assigning a particular code from the "chunk code space." The chunk code space is the set of all possible settings of the units comprising the "chunk coding layer." This component process may be referred to as the "chunk code selection process," or "chunk choosing process," or similar phraseologies.

Second, activating the selected chunk code. In a digital embodiment, such as in a computer, a chunk code is active if the set of memory locations representing the units that comprise it are all in the active state.

Third, physically associating or connecting the selected chunk code with the items to be chunked, which again, are codes or activity patterns of the input layer. This component process may be referred to as the "chunk code association process," the "chunk-item association process," or some similar phraseologies. In order to associate a chunk code with an item, both must be in the active state in the physical memory.

A chunking process must satisfy the following two opposing constraints:

Chunking constraint 1: A chunking process assigns unique chunk codes to unique item sequences, e.g., a chunk code depends on the particular items comprising the sequence and on their order. For example, different chunk codes would be assigned to "PRE" and "PRO." For this to be the case, a chunking process must know the full sequence of items to be chunked at the time the chunk code is to be assigned. Therefore, the assignment may not occur until all the items have been presented. This would seem to imply that the assigned chunk code cannot be activated until all the items have been presented.

Chunking constraint 2: to accomplish the third component process described above, physically associating the selected chunk code with the item codes, each of those item codes must be active while the chunk code is active. This implies that the chunk code may have to be activated on the first item code of the sequence and remain active while all the remaining items of the sequence are presented. But, it does not imply that, once an item is presented (and thus its code activated), it must remain active for the remainder of the duration that the chunk code is active.

Existing embodiments of the chunking process satisfy these two constraints by maintaining (keeping "active") the codes of the individual items to be chunked until a chunk code unique to that sequence of items is selected, and activated, and associated with those item codes (4-12).

This technique may be described as temporarily "buffering" the items to be chunked in memory. The set of physical memory locations where those items are stored is referred to as the "buffer." The number, M, of locations comprising the buffer is the "size" of the buffer and it determines the upper limit on the length of sequence that can be assigned a unique chunk code, which is M.

To the inventor's best knowledge, all prior descriptions of chunking assume that the buffer represents items using a localist representation (LR) scheme: in particular, each buffer location ("slot") may hold the code of only one item at any given moment and the physical embodiment of each slot is disjoint from the embodiment of all the other slots of the buffer (FIG. 2A). Such embodiments may also be viewed as having M copies of the input layer, one for each of the M slots of the buffer. This is the case for embodiments similar to Time Delay Neural Networks (TDNNs) (13) (FIG. 2B) and for embodiments employing the "tapped delay line" concept (14, 15) (FIG. 2C). In contrast, the invention (OP) requires only a single instance of the input layer and this is primarily a consequence of the fact that OP represents items using "sparse distributed representations" (SDR) of chunk codes as well as of items.

SUMMARY OF THE INVENTION

The instant invention, overcoding-and-paring (OP), provides a computer-implemented chunking process to assign (e.g., select, activate, and associate) unique chunk codes in the chunk coding layer (chunk coding space) to unique sequences of items in the an input layer (item coding space) and to subsequently retrieve said codes based on future inputs (which may be termed, "prompts" or "queries"). As used herein, "item" may represent one or more transformed state(s) of any of many physical objects, such as a data value representing a nucleotide or amino acid (e.g., those in a DNA or protein molecule), a video frame, an audio signal, a digitally encoded text, etc., and the chunk code may represent a DNA or protein sequence, a series of video frames or audio signals, a sentence, paragraph of text, or a book, etc.

OP differs fundamentally from existing embodiments of chunking, because it does not need to keep the items to be chunked active in memory throughout the chunk assignment process. In fact, it requires only that each of the items to be chunked become active at some point during the chunk assignment process. In particular, in preferred embodiments, it allows that some (e.g., all but the last) items are active only during a period strictly prior to the time at which the final selection of chunk code that will represent the sequence is made. Yet, it allows that chunk code to be physically associated with the all the earlier items of the sequence as well as with the last item. Thus, OP meets both of the above criteria without needing to buffer the items to be chunked.

More specifically, the invention relates to a computer-based representation and methods for storing and retrieving sequences of input items, wherein each input item is represented by a purely spatial code in an input coding space. OP "stores" an input item sequence by assigning a unique purely spatial code to represent it in another coding space, called the "sequence" (or "chunk") coding space. OP also retrieves a stored sequence by activating its code in the chunk coding space. Such a code is called a "chunk code" or "chunk." The physical association of item codes to chunk codes is embodied by matrices of state-ful signal-passing connections, which either connect the units of one space to the units of another, or connect the units of one space back onto themselves (recurrently). A connection's state is described by two variables, its weight and its "lability," which indicates whether or not its weight can be changed. These matrices and their operation will be described below in more details.

At first glance, it may sound like OP violates causality. For a chunk code to be selected in a way that depends on the whole sequence, the whole sequence must be known and must therefore have been presented. Thus, it seems that the selection must take place after the whole sequence is presented. However, for a chunk code to be physically associated with an item code, it must be active at the same time as that item code. Thus, for a chunk code to physically associate with all the items comprising the sequence it represents, it must be activated during the sequence's first item and remain active throughout the rest of the sequence. This implies that the chunk code must be activated before it is selected.

As described below in more details, OP is able to solve this problem (e.g., satisfies both chunking constraints) by using a "selectionist" paradigm. The core idea of the selectionist paradigm is that a plurality of solutions to a problem are activated at the outset of the solution process when information relevant to the problem begins to be available (in the instant case, for example, when sequence items begin to be presented as input to the chunking process), and that members of the plurality are removed (deactivated) over time as additional information becomes available, until only one solution remains active. This meets chunking constraint two, because the single chunk code (solution) that is ultimately selected to represent the sequence is, in fact, active throughout the sequence. It also satisfies chunking constraint one, because that ultimate selection event does not take place until the last sequence item (all of the information relevant to the problem) has been presented.

To simplify description of the operation of the invention, we describe two modes of operation for OP. The first mode is the "learning mode" (or "training mode") during which one or more sequences is presented, one time each, to the system, and during which chunk codes are assigned to said sequences. The set of sequences presented during the learning period may be called the "learning set" or "training set." The overall system that exists at the end of the training period may be called the "trained system." The second mode is the "test mode" or "retrieval mode," during which the trained system may, when appropriately "prompted" or "queried," activate chunk codes and more generally, codes at any and all layers including the input and all internal layers.

A trained system may be prompted (queried) by presenting the first item of a sequence of items that was learned in the training period, or any portion of that sequence, including the whole sequence. If, when prompted, a particular chunk code is activated, the system is said to have "recognized" the presence of the corresponding item sequence in the input. In general, said chunk code may become active prior to all of the sequence items having been presented. In this case, the system can be viewed as having recognized that the sequence is currently occurring ("unfolding") but has not finished yet. Activation of an chunk code in this case provides a basis for predictive (anticipatory) responding to inputs (FIG. 3A). In FIG. 3A, presentation of the first item "C" causes (via an intermediate representation of "C" in Level 2, which will be described in the detailed description of the invention) a chunk (at Level 3) to be activated (the active state is represented by the "gray" here). Once activated, this chunk code can in principal send signals to other elements of a complete system that could initiate output responses consistent with "CA" even though the second item "A" has not yet been presented. Note that the point is not being made here that such an initiated response would necessarily be correct (afterall, there is no guarantee that the next item will in fact be "A"), but simply that having in the past experienced "CA" and built a representation of that occurrence, including a chunk code, there is a physical basis for anticipatory responding.

Once activated in response to a prompt, a chunk code can cause the remaining items of that sequence (e.g., their item codes) to be activated in succession in the input layer (FIG. 3B). This type of retrieval is called "recall." In the preferred embodiment, the chunk code in this case, will remain active while the remaining item codes activate in sequence. Note that in the case of recall, the input layer also acts as an output layer. See figure descriptions section for detailed explanation of FIG. 3B.

It must be emphasized that a prompt may consist of one or more items that occurred at mid-sequence positions of an original trained sequence (e.g., a prompt might not include the sequence's first item). For instance, having learned "BUG" and "BAT," if we then prompt the trained system with item "A," it has enough information to activate the chunk for "BAT" and activate item "T" in the input layer.

A prompt can also be an entirely novel sequence (one that has not previously been learned). In this case, the system may activate the chunk code of the learned sequence that is most similar to the prompt. In this case, the system effectively co-classifies the prompt sequence with that most similar learned sequence. This capability is sometimes termed "nearest-neighbor retrieval" of "best-match retrieval."

Note that although we classify OP's operation into two modes, learning and retrieving, the operational details are very similar between them, and in practice, OP does not necessarily require this distinction. That is, once put into service, "learning trials" and "retrieval trials" may be interleaved arbitrarily. In particular, learning of new sequences does not overwrite or erase prior learning. Thus, OP is an instance of what is sometimes called an "incremental learning paradigm" or a "sequential learning paradigm" (16). Not only does OP learn according to a sequential learning paradigm, but it learns according to a "single-trial" learning paradigm. That is, every sequence is learned with only one presentation.

Provided below are descriptions of OP's selectionist operation for both learning mode and retrieval mode.

The following steps illustrates a high-level version of the OP learning method or mode:

Step 1: Presenting the first item, from a sequence of items, to the chunking process. This may be physically achieved by activating the input-layer code for that presented item.

Step 2: Simultaneously activating a plurality of chunk codes (e.g., activating the set of representation units that represent those codes) in response to, and in manner that may depend on or be constrained by the first item.

Step 3: Physically associating every one of the plurality of the activated chunk codes (representation units) with the activated item. This may be physically achieved by setting the weight of every connection between an activated unit of the input layer and an activated unit of the chunk coding layer to a value of 1. If any of these weights are already set to 1, then no change is made to this connection's state. Note in particular that if the connection's "lability" flag is "yes," then it remains labile.

Step 4: Presenting the next item of the sequence. This may be physically achieved by activating any input-layer units contained in the code for this item and deactivating any input-layer units not contained in the code for this item.

Step 5: Deactivating a subset of the plurality of the currently active chunk codes. The choice of which chunk codes are deactivated may depend on the just-presented (see Step 4) item. This step may be referred to as the "paring operation" or simply "paring." A chunk code that remains active after the paring may be referred to as having "survived" the paring. Paring may be physically achieved by deactivating any chunk layer unit that is not contained in any surviving chunk code.

Step 6: Physically removing (erasing, unlearning) the association ("disassociating") between every one of the deactivated chunk codes and, a) the code of the item presented in Step 4 and, and b) the code of any earlier item in the sequence. This may be physically done by setting the weight of every labile connection between a chunk layer unit deactivated in Step 5 and an inactive input-layer unit to 0.

Step 7: If only one chunk code remains active, the sequence has been chunked, and that remaining (surviving) chunk code is the chunk code that represents that particular item sequence. At this time, the lability flag of any connection whose weight is 1 can be set to 0 (or "no"), meaning that that weight can no longer be changed. This action can prevent the learning of subsequent sequences from erasing previously learned sequences. Otherwise, if multiple chunk codes still remain active, go to Step 4 and repeat.

The number of paring steps that this process will perform depends on the number (Y) of chunk codes in the initially activated chunk code plurality (in Step 1) and the number of (or, fraction of, Z) chunk codes remaining as active chunk code plurality in each paring. Y and Z can be fixed or adjustable parameters in any particular embodiment of OP. This implies that the number of parings may be fixed. For example, if Y=256 and Z=¼ (e.g., initially activating 256 chunk codes, and ¼ of the then activated chunk codes remaining active after each paring), then the number of parings needed to pare down to a single chunk code is 4: i.e., initial—256, 1st paring to 64, 2nd paring to 16, 3rd paring to 4, and 4th paring to 1.

For simplicity and illustration purpose only, the chunking examples used in the detailed description of OP (FIGS. 10-12) involve sequences containing only two items. This means that only one paring operation will occur before a sequence's final (second) item is presented: specifically that will be the paring operation that takes place when the second item is presented. This means that parameters (Y, Z, and others described later) must be set so that that paring operation deactivates all but one of the chunk codes contained in the initially activated plurality of chunk codes. Note however, that generalizations of the basic OP method, which can chunk sequences up to any predetermined length, are possible.

The initially active plurality of chunk codes, and any of the subsequent pluralities that result from a paring operation, may be referred to as an "overcode." The single chunk code remaining active, when the last sequence item is presented, may be referred to as "the chunk code" for that sequence. That chunk code may be referred to as having "survived all parings." Because there may in general be more than one paring event during the processing of a sequence, the initially active plurality (activated during the sequence's first item) may be referred to as the "first overcode," or "overcode 1," or similar expressions. The overcode that results from the first paring operation as the "second overcode," or "overcode 2," etc.

As noted in the high-level OP learning method described above, the choice of which chunk codes are deactivated when an item is presented depends on that item. In this case, the overcode that remains after a paring operation depends on that item. Because the overcode determined by the $i^{th}$ paring operation is pared from the previously active overcode, it depends on that previous overcode. Because that previous overcode depends on the previous $((i-1)^{th})$ sequence item, the overcode determined by the $i^{th}$ paring operation depends on the previous sequence item. Thus, an overcode formally depends on both the currently presented sequence item and, by transitivity, all the preceding items of the sequence. Thus, the final chunk code assigned to a sequence depends on the entire sequence of items, thus satisfying the first chunking constraint.

The following description illustrates a high-level version of the OP retrieval method/mode:

Step 1: Presenting the first item, of a sequence of items, to the chunking process. This may be physically achieved by activating the input-layer code for that item.

Step 2: Simultaneously activating a plurality of chunk codes (the first overcode) in response to, and as a function of, the first item. The OP learning method is such when the first item of a test (query) sequence is presented, that first overcode will, with a probability that depends on system parameters and the training set, include the chunk codes of all learned sequences that begin with that first item.

Step 3: Presenting the next item of the sequence. This may be physically achieved by activating any input-layer units contained in the code for this item, and deactivating any input-layer units not contained in the code for this item.

Step 4: Deactivating a subset of the first overcode, resulting in the next overcode or a final chunk code. The choice of which chunk codes survive this paring must depend on the just-presented (see Step 3) item. In particular, all previously assigned (during the learning period) chunk codes compatible with the sequence of items presented thus far should remain active in the next overcode. In addition, some (possibly large) number of other as-yet-unassigned chunk codes will also be contained in the next overcode.

Step 5: If only one chunk code remains active, the sequence has been recognized, and that remaining (surviving) chunk code is the chunk code that represents that particular item sequence. If at any point, only one chunk code remains active, the system is said to have "definitively recognized" that the sequence has occurred (or is occurring). If multiple chunk codes still remain active, go to Step 3 and repeat.

Because the complete unique chunk code for a sequence becomes active during the first item of a sequence (even though that complete unique code may be contained within a larger overcode), the possibility exists for the embodiment to emit responses that are specific to the entire sequence after only the first item has presented, whether or not that first item distinguishes the yet-to-be-completed sequence from all other previously learned sequences.

To illustrate, assuming that the system has previously, during a learning period, been presented with and formed representations of just the two sequences, "RAIL" and "RAID" (e.g., these two sequences have been stored in this system). If item "R" is later presented to the system, the complete and unique codes for both sequences will become active. These two codes will both simultaneously exist as different but possibly intersecting subsets of the overcode that is active. Because these two representations will be physically active (again, as subsets of the overcode), the system as a whole can immediately begin to emit responses that have been previously physically associated with both of these representations.

Note that the system may not be able to emit behavior that fully distinguishes which sequence will occur, but the system will be able to emit previously learned behaviors that have been linked with these sequences. The utility of this predictive (or anticipatory) behavior becomes more clear if it is assumed that the system has previously learned three sequences, "RAIL," "RAID," and "BOOK." In this case, if "R" is presented, the system can emit behaviors consistent with both "RAIL" and "RAID" but not with "BOOK." This would not be possible in a system which REQUIRES a fixed number of items to be present (in a buffer), in this case, four items, before deciding what sequence has been presented, and does not activate representations of whole sequences prior to making that decision.

Thus, in one aspect, the invention provides a computer-implemented method for encoding or storing one sequence of items, out of a plurality of similar sequences of items, in a distributed representation (DR), the method comprising: (1) from a plurality of representation units, activating and associating a selected subset of representation units upon presentation of the first item of the sequence of items to generate a plurality of active representation units (a DR) associated with the first item; (2) upon presentation of the next item of the sequence of items, deactivating and disassociating a subset of active representation units; and, (3) repeating step (2), for each successive item of the sequence of items presented (if any), wherein the remaining set of active representation units is the DR that encodes said one sequence of items.

In certain embodiments, the DR is a sparse distributed representation (SDR), and wherein the ratio of active representation unit/total representation unit is no more than ½, ⅓, ⅕, 10%, 1%, 0.1%, 0.05%, or 0.01%.

In certain embodiments, the plurality of similar sequences of items have common items, or common subsequences of items.

In certain embodiments, each item in said sequence of items represent a data value (such as a biosequence data value), a number, a letter, a character, a symbol, a video frame, an audio signal, a digitally encoded text, a time sequence, a letter or symbolic representation of a nucleotide or amino acid, or a distributed representation for another sequence of items in a different layer.

In certain embodiments, the plurality of similar sequences of items contain 2, 3, 5, 10, 20, 50, 100, 200, 500, 1000, 5000, $10^4$, $10^5$, $10^6$ or more similar sequences of items.

In certain embodiments, the plurality of representation units comprise at least 100, 200, 500, 1000, 5000, $10^4$, $10^5$, $10^6$, $10^7$, $10^8$, $10^9$, $10^{10}$, $10^{11}$, $10^{12}$, $10^{15}$, $10^{20}$, $10^{25}$, $10^{30}$, $10^{35}$, $10^{40}$ or more representation units.

In certain embodiments, the plurality of active representation units comprise at least 10, 20, 50, 100, 200, 500, 1000, 5000, $10^4$, $10^5$, $10^6$, $10^7$, $10^8$, $10^9$, $10^{10}$, $10^{11}$, $10^{12}$ or more active representation units.

In certain embodiments, each of the plurality of representation units or the plurality of active representation units is a physical memory unit capable of adopting either an ON state (1) or an OFF state (0). In other embodiments, each units may have more than two states.

In certain embodiments, step (2) is repeated two or more times.

In certain embodiments, the sequence of items contains 2, 3, 5, 10, 20, 50, 100, 500, 1000, 5000, 10,000, 50,000, $10^5$, $10^6$, $10^7$, $10^8$, $10^9$ or more items.

In certain embodiments, the plurality of similar sequences of items contains 2, 3, 5, 10, 20, 50, 100, 500, 1000, 5000, 10,000, 50,000, $10^5$, $10^6$, $10^7$, $10^8$, $10^9$ or more sequences of items.

In certain embodiments, the degree of connectivity for the connection matrix is less than 100%, 90%, 80%, or lower.

In certain embodiments, the weight of each connection between the active representation units and the associated items has more than two states, and/or can be continuously valued. In such embodiments, the range of weight values from small to large can be used to encode the number of times a particular unit-to-unit association may have occurred during the processing of the training set. Such information may, during a test query, provide the system with a basis for computing a distribution over the likelihoods of possible next items, and more generally over the likelihoods over possible sequence completions of any prescribed length.

In certain embodiments, representation units have more than two states, and/or can be continuously valued.

In certain embodiments, the sparse distributed representation/code is enforced (at any given layer) by specifying the number or fraction of the representation units that may be activated at any time (not by organizing the layer into WTA CMs).

In certain embodiments, the sparse distributed representation/code is enforced by organizing the layer into WTA CMs, and by specifying the number or fraction of the CMs that may be activated at any time.

In certain embodiments, the number of representation units per CM varies either within or across layers or both.

Another aspect of the invention provides a computer-implemented method for retrieving, from computer memory in which the distributed representations (DRs) representing a plurality of sequences of items have been stored, a distributed representation (DR) that encodes a query sequence of items, the method comprising: (1) from that plurality of stored DRs, activating a selected subset of DRs compatible with a presented item or a presented sub-sequence of items of said query to generate one or more active DRs; (2) presenting additional item(s) or additional sub-sequence of items of the query, and deactivating, from the plurality of active DRs, active DRs that are incompatible with the additional item(s) or additional sub-sequence of items that have been presented thus far; and, (3) repeating step (2), for further additional item(s) or further additional sub-sequence of items of said query, wherein the remaining set of active DR units either: a) encodes said query sequence of items or; b) if the fully presented query sequence of items is not identical or sufficiently similar to any of the sequences of items for which a DR has been previously stored, no units remain active.

As used herein, a DR that has previously been assigned to represent a sequence of items (i.e., a DR which has been stored in the computer memory, or which constitutes the representation of a sequence of items that is now considered to be stored in the computer memory) is "compatible" with a query sequence if the sequence of items represented by that DR matches either identically, or within some tolerance that is a function of system parameters, the query sequence of items up to the item of the query sequence presented thus far. Otherwise, a DR is "incompatible" with the query sequence.

In certain embodiments, the plurality of DRs encode the candidate sequence of items using the encoding method of the subject invention.

In certain embodiments, the presented item is the first item of the query.

In certain embodiments, the presented sub-sequence of items is the first two items of the query, two or more consecutive internal items of the query, or an initial portion of the query of any length up to and including the whole query sequence.

In certain embodiments, the DR is a sparse distributed representation/code, and wherein the sparse distributed code is enforced (at any given layer) by specifying the number or fraction of the representation units that may be activated at any time (not by organizing the layer into WTA CMs).

In certain embodiments, the DR is a sparse distributed representation/code, and wherein the sparse distributed representation/code is enforced by organizing the layer into WTA CMs, and by specifying the number or fraction of the CMs that may be activated at any time.

In certain embodiments, the number of representation units per CM varies either within or across layers or both.

Another aspect of the invention provides a computer-implemented method having multiple layers, each using the (encoding and/or retrieving) methods of the subject invention, wherein distributed representations (DRs) at each higher layer encode sequences of items at the immediate lower layer, which sequences of items are DRs at said immediate lower layer that encode sequences of items at the next lower layer, etc.

In certain embodiments, the first paring event at each higher layer occurs after the first paring event at its immediate lower layer.

In certain embodiments, the representation units of an internal layer have additional connection matrices that connect them to representation units of other layers or entities.

In certain embodiments, the coding rate of any of the layers is variable within a range (e.g., 1%-2%, or not fixed).

Another aspect of the invention relates to a computer system specifically designed to carry out/implement the steps of the inventions, including means to execute specific steps of the subject methods.

For example, the invention provides a computer system for encoding (or storing) one sequence of items, out of a plurality of similar sequences of items, in a distributed representation (DR), the system comprising: (1) a plurality of representation units, wherein at least a selected subset of said plurality of representation units, upon presentation of the first item of the sequence of items, are programmed to be (or are capable of being) activated and associated with said first item to generate a plurality of active representation units associated with the first item; and, (2) a mechanism (or means) for deactivating and disassociating, from the plurality of active representation units, active representation units that are incompatible with the sequence of items that has been presented thus far, upon presentation of the next item of the sequence of items.

It is contemplated in the instant application that, where a series of alternative values are recited for a specific parameter, any of the two recited values can constitute the upper and lower limits (independently inclusive or exclusive) for a range of values. In addition, numbers intermediate to those recited are also included in the scope of the invention.

In is further contemplated that all embodiments described herein can be combined with any one or more other embodiments (unless specifically prohibited), including embodiments described under different aspects of the invention.

For the step sequences recited herein, the steps do not necessarily have to be carried out in the specific sequences as illustrated. Certain functions or steps may be carried out simultaneously or in an alternative sequence.

BRIEF DESCRIPTION OF THE DRAWINGS

FIG. 3B shows that, once a sequence's chunk code is active, it can cause the individual item codes for that sequence to be activated in succession in the item-coding layer. Here, a prompt item "C" has activated the chunk code for "CAKE" on the first time step (top panel). We then show the successive states of the system on the next three time steps as top-down (D) signals from L3 to L2 and L2 to L1 cause the associated codes to activate. Notice that when the chunk code becomes active its top-down signals (down arrows) will facilitate the activation of all item codes associated with that chunk code during learning, i.e., all four L2 codes here, equally strongly. In order to cause the codes for the successive items to read out on successive time steps, the invention (OP) requires the existence of an intermediate layer (L2) which contains a horizontal (H) matrix of connections which are adjusted during learning to encode the temporal dependence from the L1 code active at time t to the L2 code active at time t+1. On the recall trial pictured here, once the first L2 (for "C") is active, it gives rise to signals propagating in the H matrix which will arrive back at L2 on the next time step. These H signals will combine with the D signals from L3 to cause only the correct L2 code (and transitively, the correct L1 code) to activate on any given time step (panels, ii-iv). Note that this diagrammatic format indicates the timing of when codes activate and inactivate and which codes they help to cause to become active, but it might suggest that there are multiple "slots" (copies) of L1 and L2 (as in the FIG. 3): this is not the case, there is only one copy of each layer in the system described.

FIG. 10 illustrates the assigning of an L3 chunk code, using the OP method, to a sequence of two L2 CD item codes and transitively, to the sequence of L1 items, [HE]. A middle level (L2), with all-to-all horizontal connectivity (representative connections of which are shown according to conventions specified below), is added to encode item order. The chunking level is L3. An overcode (seen in panels B, C, and F) consists of two winners per CM. Gray units with black outlines, as in L2 in panels F-H, are inactive units that were active on the previous time step (t=1). Horizontal signals are seen originating from L2 units in panel B. Some are shown arriving back at (recurring to) the newly active (black) L2 units in panel G, causing permanent weight increases (black triangle endings on connections). See text for detailed step-by-step explanation. Conventions for this and the next two figures are as follows. For horizontal connections: a thin gray arc indicates a "naive" connection, which is one whose weight is 0; a thick gray arc with or without a gray triangle ending ("synapse") indicates that the connection's weight has just been increased to 1 (on the current time step in the figure) and that it is still labile; a black arc with or without indicates a weight that is permanently increased to 1 (no longer labile); and, a dotted gray arc indicates a connection whose weight was transiently increased but has been erased (set back to 0). For vertical (i.e., either U or D) connections: a thin gray line indicates a "naive" connection (weight is 0); a thick gray line indicates that the connection's weight has just been increased to 1 (on the current time step in the figure) and that it is still labile; a black line indicates a weight that is permanently increased to 1; and, a dotted gray line indicates a connection whose weight was transiently increased but has been erased (set back to 0). Note that to reduce clutter, a line representing a vertical connection represents both the U and D connections between the two units. This is possible because the learning protocols used in this system are such that the changes (increases, decreases, and transition from labile to not labile) will always be synchronized for the U and D connections connecting a given pair of units. For L3 (or any layer at which paring can occur, i.e., any layer that does chunking using OP): a pared-out unit appears as light gray with no outline.

FIG. 12 shows that presentation of a familiar sequence [HE] leads to recognition.

Figure 1C:
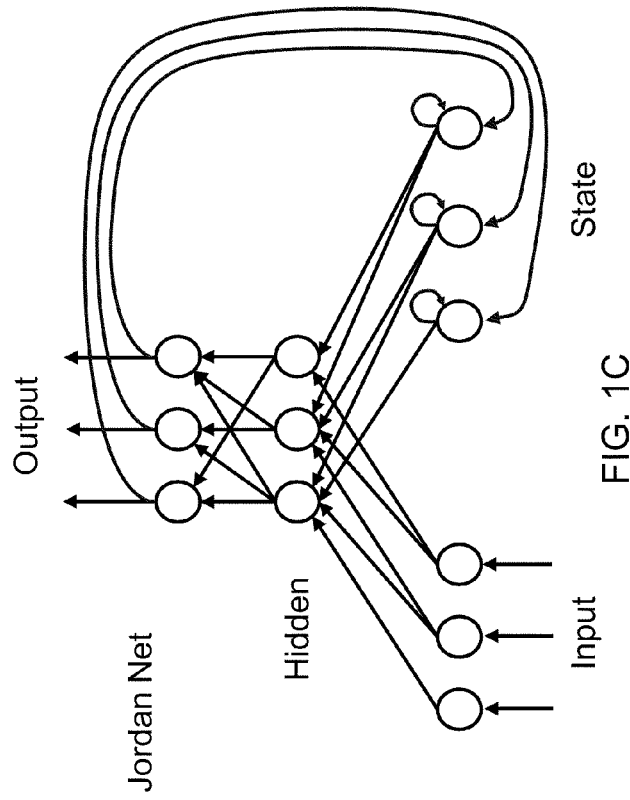
FIG. 1C illustrates a recurrent neural network (RNN). In this particular RNN (based on Jordan, 1986), the output representation field of units fed back to a field of "state" units via connections that can simply implement the identity transform. These state units send signals to the internal coding layer along with the next input from a temporal sequence. Thus, each new code formed at the internal layer will depend on both the history of the sequence so far and the current input.
Figure 1B:
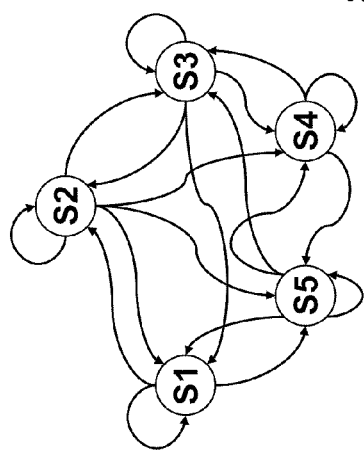
FIG. 1B illustrates a hidden Markov model (HMM). The table parameters are the probabilities of transitioning from the state indexed by the row to the state indexed by the column. Parameters corresponding to transitions for which there is no arrow in the network would be 0.
Figure 1A:
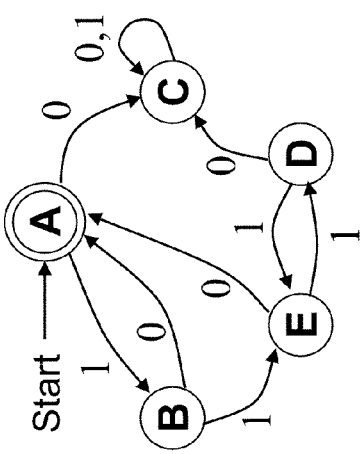
FIG. 1A illustrates a finite state machine (FSA).
Figure 2:
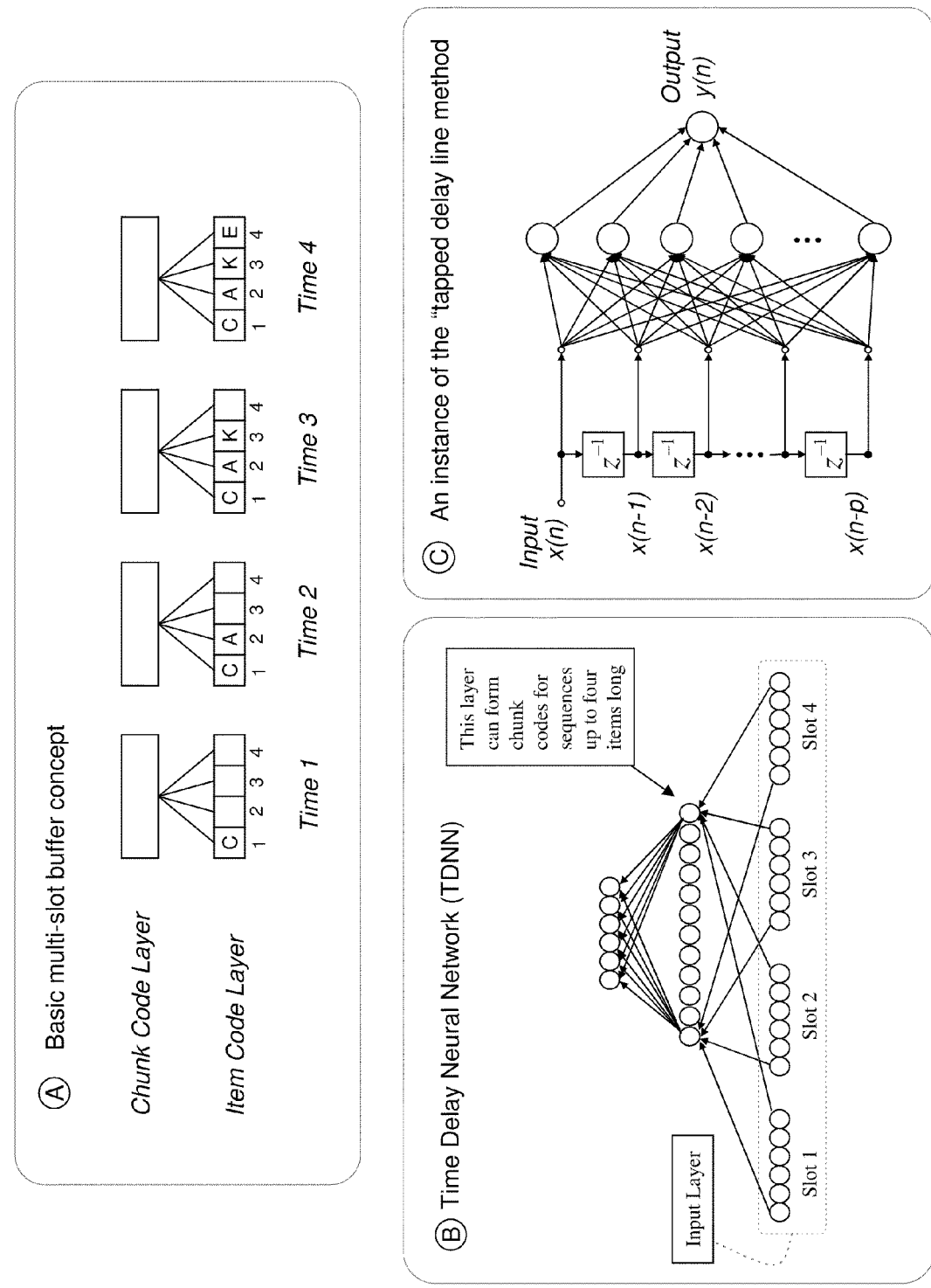
FIG. 2A illustrates traditional buffer-based chunking concept. The first item, C, enters slot 1 at t=1. Item A then enters slot 2 at t=2, etc. Once the buffer is full, a chunk code that depends on the entire sequence "CAKE" can be chosen and associated with all four item codes.
FIG. 2B illustrates a time-delay neural network (TDNN). Here, the fact that each slot of the buffer is actually an entire, physically distinct instance of an input layer, e.g., an array of feature detectors, is made more apparent.
FIG. 2C illustrates a tapped-delay line concept. In addition to the input signal, x(n), being sent, without temporal delay, to all units of an internal coding layer (middle column of circles), it is also repeated up to p times, each time with a delay (represented by the boxes label "$z^{-1}$") which in practice would equal the time it takes for the next input item of a sequence to be presented. Thus, at any point in time while processing a sequence, the internal coding layer (e.g. chunking layer) would have up to the p most recent sequence items simultaneously present as input and thus be able to form codes that depend on up to the p most recent items.
Figure 3A:
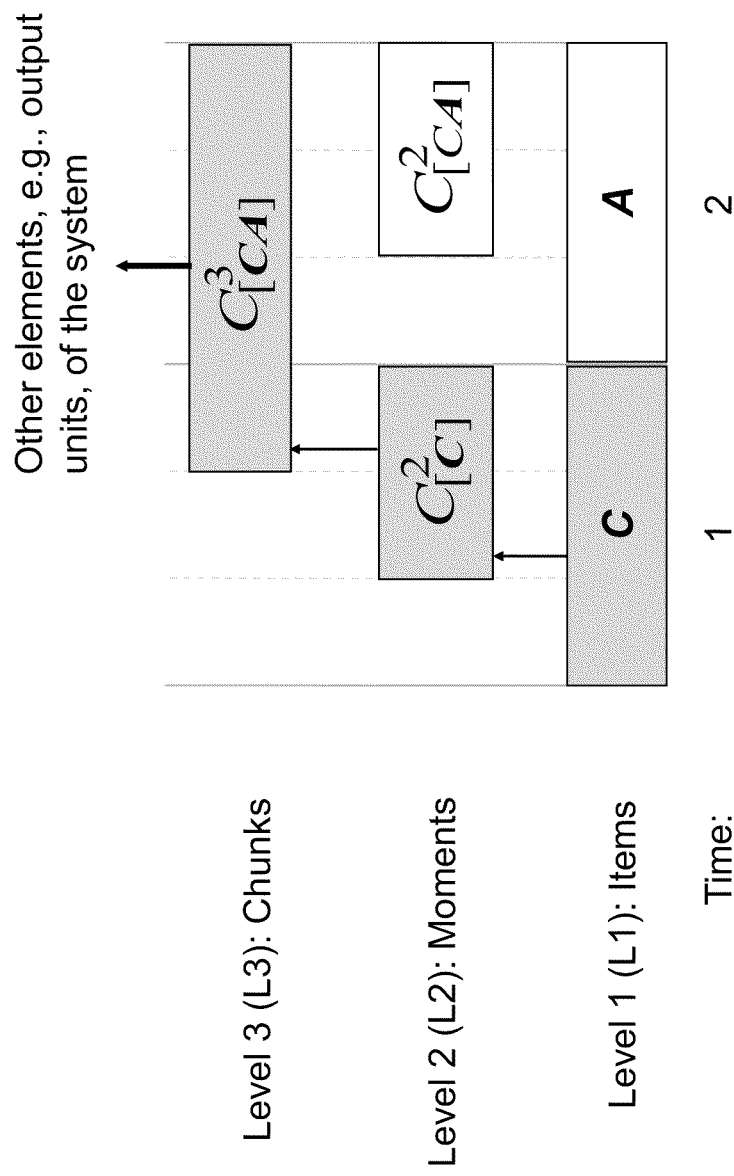
FIG. 3A shows activation of a chunk code for the sequence "CA" based on the first item of a test sequence, but prior to all of the sequence items having been presented. Gray indicates an active code. At a fine temporal scale, the three codes, as layers L1, L2, and L3, would become active in rapid sequence, but all three, and in particular, the L3 chunk code, becomes active while the first item, "C", is still presenting (active in L1). Here, we assume that "CA" has been learned and assigned a chunk code in the past. That code is denoted $C_{[CA]}^3$, where the superscript denotes the code's layer and the subscript denotes the sequence that the code represents. In this case, the system can be viewed as having recognized that the sequence is currently occurring ("unfolding") but has not finished yet. Activation of a chunk code in this case provides a basis for predictive (anticipatory) responding to inputs because other potential elements of the system could receive signals from $C_{[CA]}^3$, i.e., from the physical elements representing $C_{[CA]}^3$, and initiate some form of response.

All text of the figures above, and that of the U.S. Provisional Application No. 61/273,144, filed on Jul. 31, 2009, are incorporated herein by reference.

DETAILED DESCRIPTION OF THE INVENTION

1. Definitions

A physical system may consist of different "parts" or "elements." At any particular moment in time, a physical system's elements will be in a particular "arrangement" or "configuration." A particular configuration of (or a setting of the values of) the elements comprising a physical system may be called a "state" of the system. A "state" is purely spatial, and has no temporal aspect, because it exists all at once, at particular moment. The set of all possible states, which a physical system can be in, may be called the "state space."

For example, a single byte of a typical computer memory has 8 bits, thus the state space of the byte has $2^8=256$ states, since each of its eight bits (elements) can be set in either one of two states—"active" ("on," 1) or "inactive" ("off," 0). Thus there are $2^8$ different ways that the eight bits can be set (e.g., 00000000, 00000001, 00000010, 00000011, ..., 11111111). However, in certain embodiments of the invention, each representation unit (as defined below) may have two or more states, or be continuously valued (infinite number of states).

In general, a physical system's state will change over time. The physical system, over a period of time, may be described as a sequence of states, and may be referred to as a "state sequence" or "time sequence." The state of the physical system at a particular moment in time may be referred to as the state that is "active" or "that exists" at that particular moment in time.

A physical system R, whose states represent (or "code for") the states of another physical system S, or for sequences of states of S, or for pluralities of states, or for pluralities of sequences of S, is called a "representing system." S here may be referred to as the "represented system" or the "domain." Any of the aforementioned entities, e.g., states, sequences of states, or pluralities of either, may be referred to as "representees." Note that a represented system can itself be a representing system for yet another physical system (e.g., physical system T). The elements comprising a representing system may be termed "representational units" or just "units." A particular state of a representing system is a setting of the values of all its units. We refer to such as a "representation" or a "code," and to the set of all possible states of a representing system as the "representation space" or "code space."

As used herein, an "overall system" consists of two or more representing systems, the first of which may be termed an "input layer," and the rest of which may be called "internal layer(s)." See below for definition for "layer." The codes that become active in the input layer represent the presence of, or arrangement of, physical objects in the environment of the overall system. The input layer's representational units may be referred to as "feature detectors," or as "object detectors," or as "item detectors." For simplicity, the input layer units (detectors) discussed herein may be bits in a computer: if a unit's representee (feature, object, item) is present in the environment, then that unit is active, otherwise, it will be inactive. Note, however, that the invention described herein allows input units with any number of discrete states.

Representing systems fall into two classes based upon the relationship of the system's units to the representees. "Localist representing" (LR) systems (FIG. 4A) and "distributed representing" (DR) systems (FIG. 4B).

An LR system is one in which the code for any particular representee is either an individual unit or a set of units, none of which participates in (or is part of) the code for any other representee. That is, the codes of all representees are physically disjoint from each other. If the unit (units) comprising the code for a particular representee is (are) active, that representee is "present" in the domain, e.g., that representee has been "detected" or "recognized" in the domain. An LR comprised of N units can represent at most N representees. The descriptions/examples herein may use an LR representation in the input layer, and the input layer units detect features.

In contrast, a DR system is one in which: a) the code of every representee is a set of units; and b) any particular unit may generally participate in the codes of many representees. Therefore, the codes of different representees may generally overlap or intersect.

Figure 4:
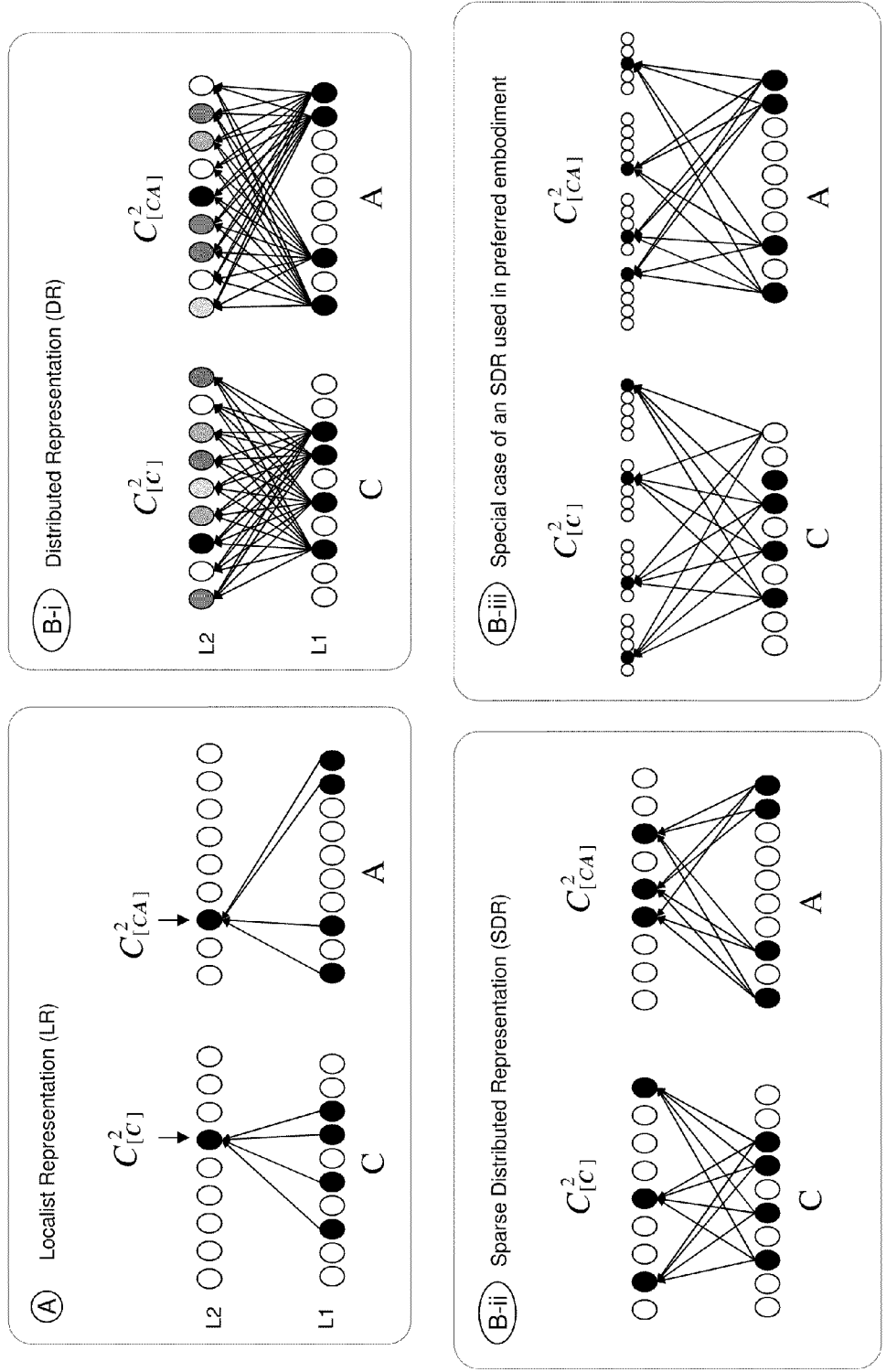
FIG. 4A illustrates a localist representation (LR) scheme. Every representee is represented by a unique representational unit that is physically separate from all other units. Here we show two example L2 codes and the connections that would be adjusted (increased) to encode the association from L1 to L2.
FIG. 4B illustrates different distributed representation (DR) schemes. i) A fully distributed representation. Here, the units' activation levels are real-valued (or discretely-valued) and every unit formally participates in every L2 code. The different activation levels are suggested with different shades of gray. ii) A sparse distributed representation (SDR) scheme. In this special case of SDR, the coding rate is ⅓, i.e., 3 of nine units are active in any particular code. This is also called an "n-of-m" code, e.g., 3-of-9 code. iii) This second version of SDR shows the version used in the preferred embodiment of OP and in the remainder of this application. Here, an internal coding layer, e.g., L2, is partitioned into Q=4 winner-take-all (WTA) competitive modules (CMs). In the standard WTA case, there can be only one winner per CM in any given code, thus every L2 code in this case, will have exactly Q active units. Note that there are $K^Q$ unique codes possible here, where K=5 is the number of units per CM. The coding rate is 1/K. Note that in the two SDR examples, the L2 codes for the two inputs intersect.

A fully distributed representation, in which every unit formally participates in every code is shown in FIG. 4B-i. A special case of a DR system is a "sparse distributed representing" (SDR) system and two version of SDR are shown in FIG. 4B-ii and FIG. 4B-iii. An SDR is a DR in which the number of units participating in any one code is far less than the total number of units (e.g., about 0.05%, 0.02%, 0.01%, 0.005%, 0.002%, 0.001%). The fraction of a layer's units that participate in any given code in that layer is termed, the "coding rate."

Figure 5:
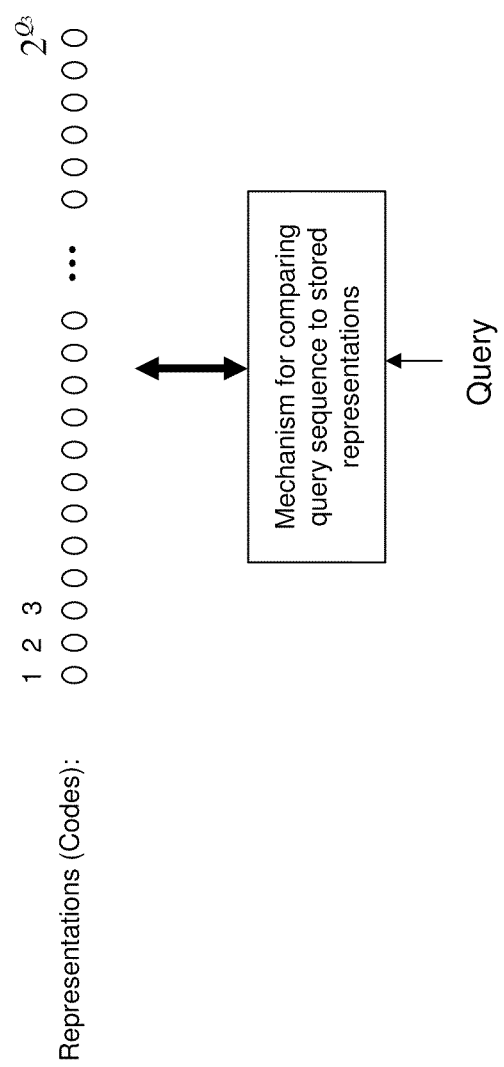
FIG. 5 illustrates an embodiment of the subject chunking system, overcoding-and-paring (OP), cast using a non-preferred, localist representation (LR) scheme. This figure simply illustrates that under a localist code assumption, exponentially more representational units are needed to represent a given coding space than if DR coding is used. For example, $2^{Q_3}$ unique binary codes can be represented in $Q_3$ binary units (bits), but $2^{Q_3}$ bits are needed if a localist code is used.

The invention described herein may be defined and operationalized using LR (FIG. 5) or DR, but because the use of SDR exponentially increases the invention's operating efficiency (as compared to LR), SDR is preferred. Preferably, one or more internal layers of the invention use SDR. Even more preferably, all internal layers of the invention use SDR. Preferably, the number of units comprising a code of an internal layer is fixed and constant.

As defined above, a representing system is a physical system (such as a computer or its memory) whose states represent (code for, or functionally correspond to) entities defined over the states of another physical system. The details below relate to how that functional correspondence (or "mapping") from the represented system to the representing system might be physically embodied.

A mapping between two physical systems, both of which may be representing systems and referred to as "layers," may be represented by a set of elements, called "connections," each of which represents a relationship between a unit in one layer and a unit in the other layer. The two said units are said to "impinge" the connection. One impinging unit will be termed that connection's "origin unit," or just "origin," and the other will be termed that connection's "terminating unit," or just "terminus." Thus, a connection, and the relationship it represents, has a "direction," e.g., a connection might represent the probability that the terminus will be active when the origin is active. Or, it might represent an amount of evidence that the terminus unit should be activated when the origin unit is active.

A connection is "stateful," and its state is described by two variables: its "weight," which is a measure of the strength of association between the two units, and its "lability," which indicates whether the connection's weight may be changed or not. In the detailed description of OP, a rule is provided, by which connection weights change as a function of the states of the units and other variables. For simplicity, the descriptions and analyses herein may use connections with only two possible weights, e.g., "binary weights" (with values 0 and 1). However, OP can be generalized to use connections with more values. Note that in any physical embodiment, both representational units and connections may be represented by values in particular memory locations.

The set of connections from one layer to another is called a "connection matrix," or "synaptic matrix." One layer is called the "origin layer" whose units are the origins of the connections and the other layer is called the "terminal layer" whose units are the terminuses of the connections. The origin and terminal layers may be the same layer in which case the matrix is called a "recurrent matrix." For simplicity, all connection matrices discussed herein may contain a connection from each unit of the origin layer to each unit of the terminus layer. E.g., if the origin layer has C units and the terminus layer has D units, then the matrix has C×D connections. This may be referred to as "all-to-all" or "full" connectivity. However, OP can be operationalized for embodiments in which connection matrices are less than full.

As used herein, "degree of connectivity" refers to the percentage of the possible pair-wise connections between the representation units of one layer and the representation units of the other layer. The degree of connectivity for the "all-to-all" situation above is 100%. A percentage value less than 100% may be used for embodiments in which connection matrices are less than full (e.g., 90%, 80%, 70%).

A connection's weight may change as a function of the signals that traverse it, for example, according to a "learning rule" given later. A connection can pass one of two possible signals from its origin unit to its terminus unit:

A. If the origin unit is active (on), then the signal passed to the terminus unit indicates that the origin unit is active.
B. If the origin unit is inactive (off) then the signal passed to the terminus unit indicates that the origin unit is inactive.

The protocol for the timing of when signals are passed is implicitly specified in (any of the three versions given of) the "code selection method" (CSM) described herein below.

As used herein, a "subsequence" is part of a sequence. For example, in a sequence of items, a subsequence of items preferably consists of some, but not all the items of the sequence. Preferably, the subsequence consists of a successive/consecutive number of items in the sequence of items, although the subsequence does not need to contain the first or the last item of the sequence of items.

2. Exemplary Embodiments and Methods of OP

Described herein below is a detailed exemplary (non-limiting) embodiment of an OP chunking system consisting of an input layer (L1), a second layer which applies a "sequentially contextualizing" transform to the item codes of the input layer (L1), resulting in "sequentially contextualized item codes" or "context-dependent (CD) item codes" in L2, a third layer which is the chunking layer (L3), and several connection matrices (some recurrent) amongst/between the layers. L2 and L3 are called "internal" layers. A CD item code is one that depends on the particular sequence of items leading up to the current item. As a shorthand, we will refer to a context dependent item as a "moment" and to its (L2) code as a "moment code." For example, the sequence [HE] consists of two moments, item H as the $1^{st}$ sequence item, denoted, [H], and item E as the $2^{nd}$ item when it follows H, denoted [HE]. In our notation, a moment's current input item is bolded. Note that [HE] is a different moment than [DE] even though the current input item, E, is the same; similarly, [HE]≠[THE].

The exemplary embodiment being described assigns unique moment codes to unique moments by combining the horizontal (H) signals arriving (recurrently) at L2, which carry information about the previously active L2 code, with the bottom-up signals arriving from L1, which carry information about the current purely spatial item, in the code selection process. In fact, almost the exact same code selection method used at L3 (described shortly, i.e., the CSM) is also used at L2 (and every internal layer present in a given embodiment). The only difference is in the number of winners drawn per CM.

Figure 6:
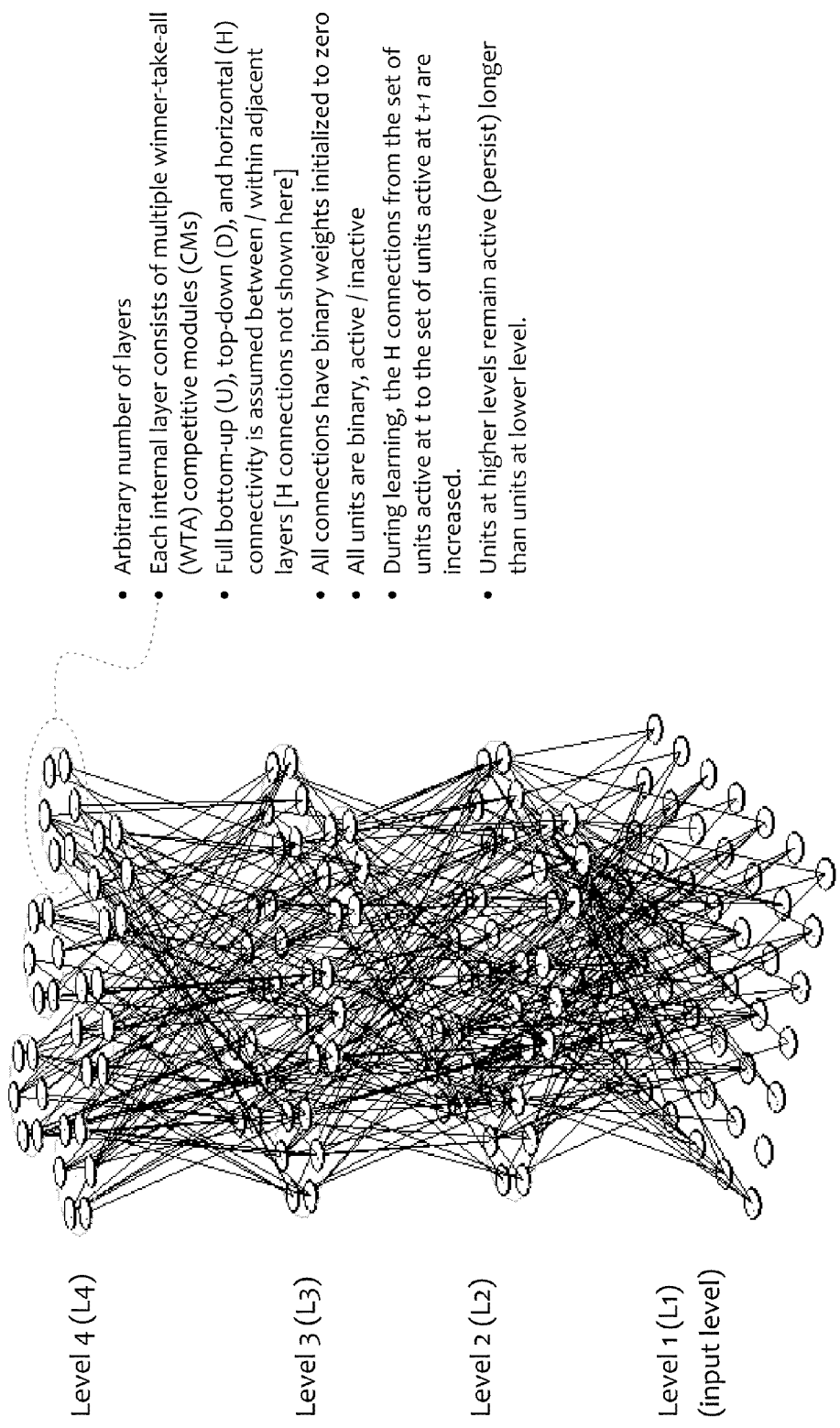
FIG. 6 illustrates an embodiment of the architecture of the subject chunking system, overcoding-and-paring (OP) cast using the preferred sparse distributed representation (SDR) scheme. See text for details.

FIG. 6 displays the architecture of this overall chunking system. L1 is comprised of $M_1$ binary feature detecting units (feature detectors). L2 is comprised of $M_2$ binary units organized into $Q_2$ "winner-take-all" (WTA) competitive modules (CM). A WTA module allows only one unit to be active at any given time, the others being inactive. Each L2 CM is comprised of $K_2$ units. Thus $M_2=Q_2 \times K_2$. L3 is comprised of $M_3$ binary units organized into $Q_3$ "variable k-winner-take-all" (vk-WTA) competitive modules (CM). The number of winners, k, that a vk-WTA module allows to be active at any given time can vary. Each L3 CM is comprised of $K_3$ units. Thus $M_3=Q_3 \times K_3$. This CM-based organization in layers L2 and L3 provides the means by which a sparse distributed representation (SDR) scheme is implemented in those layers. In particular, if $Q_2=10$ and $K_2=100$, then all L2 codes will consist of exactly 10 active units (one per CM) and the coding rate at L2 (percentage of units active in any particular code) is 1%.

Figure 7:
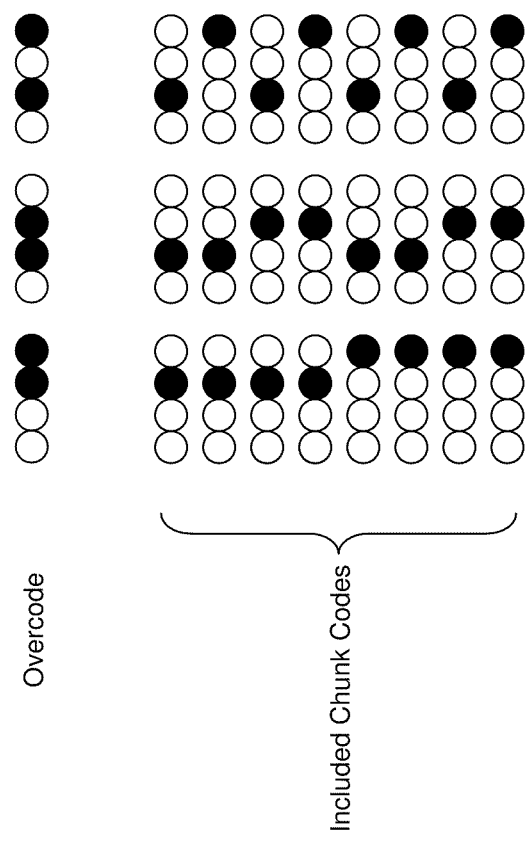
FIG. 7 shows the set of all chunk codes that are active in a particular overcode for a chunking layer with $Q^3=3$ CMs and wherein the overcode is defined as consisting of two active units per CM. The set of chunk codes contained (and active) in the overcode corresponds to all possible ways of selecting one active unit per CM from the overcode.

The reason why L3, or any chunking layer, must have vk-WTA CMs is that there must be a means for implementing overcodes, i.e., for allowing more than one chunk code (and in fact a large plurality of chunk codes) to be active at the same time. The use of vk-WTA CMs allows that to be done. In particular, the rule can be adopted that when the first sequence item is presented and an initial overcode is activated at a chunking layer, that overcode consists of two active units (winners) in each vk-WTA CM (in this case, the k=2), and that when the second sequence item is presented and the first paring event occurs, k is changed to 1 (i.e., the CMs change to operating as standard WTA CMs), causing one of the two active units in each CM to deactivate, leaving one active unit in each CM. An L3 code with one active unit (winner) per CM (a total of $Q_3$ active units) constitutes one active chunk code. Here, the number of chunk codes that are actually active, when the overcode (consisting of two units per CM) is active, is $2^{Q_3}$: there are $2^{Q_3}$ ways of picking one of two units in each of $Q_3$ CMs. All of these chunk codes are actually fully active in the overcode. FIG. 7 shows the set of all chunk codes included in a particular overcode for a chunking layer with $Q_3=3$ CMs.

In the above scenario, the chunking system pares an initial overcode consisting of $2^{Q_3}$ active chunk codes in L3 when the first sequence item is presented down to a single active chunk when the second item is presented. Thus the chunking process, whether it be assigning the chunk code to the sequence (learning) or retrieving (reactivating) the chunk code for the sequence) will be complete.

Note that for a chunking layer with $Q_3=100$ CMs, there are $2^{100}$ chunk codes that are actually physically active in an overcode consisting of two active units per CM. In order to represent $2^{100}$ active chunk codes in a localist (LR) representation, a system would need $2^{100}$ chunk-representing units, one for each chunk.

If we instead define an initial overcode to consist of three active units per CM, and we define the paring operation to deactivate just one of the active units in each CM, then: a) it takes two paring operations to arrive at a final chunk code meaning that unique sequences sharing common prefixes up to two items long can be assigned to unique chunk codes; b) the initial overcode contains $3^{Q_3}$ chunk codes; c) the first paring operation results in a second overcode that contains $2^{Q_3}$ active chunk codes; and d) the second paring results in a final single chunk code. The essential principle can be varied parametrically. For example, the initial overcode could be defined to consist of eight active units (winners) per CM, the first paring to deactivate four of those units, and the second paring to deactivate three of the remaining units, resulting in a final chunk code. In this case, there would be $8^{Q_3}$ active chunk codes in the initial overcode, $4^{Q_3}$ active chunk codes in the second overcode, and a single chunk code remaining after the second paring. It is precisely the fact that in physically operating on just a small number of active units comprising an overcode, e.g., $2 \times Q_3$, OP actually (i.e., physically) operates on a vast number, $2^{Q_3}$, of codes, which gives SDR-based embodiments of OP exponential computational advantage over LR-based embodiments.

In fact, even when only a single code is active in any of the internal layers, it is not only that single fully active code that is materially (physically) operated on, but also all codes that have any intersection with the fully active code (i.e., with the set of active units in the layer), for all such codes are then also partially physically active and therefore are also physically operated on. This is another source of the computational advantages of SDR- vs. LR-based embodiments.

Furthermore, the computational advantages described so far may all be realized by a single chunking layer. OP can be cast into a hierarchical framework in which each higher chunking layer assigns (and can retrieve) chunks of sequences in its subjacent layer; i.e., chunks of chunks, etc. This provides an additional source of compression and computational efficiency. There can be tremendous computational advantage to the extent that chunks can be manipulated in lieu of having to manipulate the more numerous individual codes (which themselves may be chunks) that the chunks represent.

An implication of the overcoding-and-paring method as described herein is that units in a chunking layer can remain active for a longer duration, when they become active, than units in the subjacent layer. In the examples of this section, chunking layer (L3) units are defined to remain active for two time steps, i.e., during the period that two sequence items are input, whereas L2 units remain active for one item, as do L1 units. We refer to the activation duration of a unit, i, as its "persistence," and denote it, $\pi(i)$. In the preferred embodiment, the (default) persistence of all units of a given layer is the same. For example, we denote the persistence of L3 units as $\pi_3=2$. Note that although all L3 units have default persistence, it is still the case that half the L3 units that become active on the first item, are pared out on the second item: these pared-out units clearly are not persisting for two time steps. Thus, a unit's persistence is overridden in the case of pared-out units, but not for units that survive paring to become the part of the final chunk code.

The embodiment shown in FIG. 6 contains two connection matrices between each adjacent pair of layers. One matrix, referred to as the "bottom-up matrix" or "U matrix," connects elements in the lower of the two layers of the pair to elements in the other layer of the pair. The other matrix, referred to as the "top-down matrix" or "D matrix," connects elements in the upper of the two layers of the pair to elements in the other layer of the pair. In addition, all internal layers also have a recurrent matrix that recurrently connects all of its units to every other unit in that layer except those in a unit's own CM. Such a matrix is referred to as a horizontal matrix, or "H matrix." All connections of all matrices have binary weights and are initialized to the state, (weight=0, labile=yes) at the beginning of the learning period.

Due to the assumption of binary units and binary weights in the preferred embodiment, the rules for updating connection weights are simple and adhere to the standard Hebbian learning scheme (17) used widely in neural networks. The learning rule for a vertical connection (either U or D), c, is as follows:
1. If the origin and terminus units are both active, its weight is set to 1 (if already 1, do nothing).
2. If either the origin or terminus unit has just been pared out and c is labile, then set weight to 0 (if already 0, do nothing)

The learning rule for a horizontal connection, c, is as follows:
3. If the origin was active at t−1 and the terminus is active at t, its weight is set to 1 (if already 1, do nothing).
4. If either the origin or terminus unit has just been pared out and c is labile, then set weight to 0 (if already 0, do nothing)

Note that during a paring operation, when units of a currently active chunk code are deactivated, any new associations (increased weights) between said removed units and units contained in the codes of all items of the sequence presented thus far, will generally be erased. "Paring" refers specifically to the deactivation of elements, not the erasing of associations, even though such erasures will generally accompany parings.

The Code Selection Method (CSM): Version 1, CMS-1

A seven-step OP learning method is described in the Summary of the Invention. Some of the Steps, 1, 3, 4, 6, and 7, are already complete in that, in the light of the architecture described thus far in this section, they can be readily reduced to practice by a person sufficiently skilled in the art. However, we have thus far described that the choice of which chunk codes are activated (or more generally, which units are activated) in Step 2 or pared out (or deactivated) in Step 5, must depend on the current input and on the previous overcode if applicable. This dependence on the previous overcode is mediated by signals arriving via the H matrix (of any given chunking layer) from the code that was previously active in that layer. Provided herein below is a specific method for making these choices. It is called the "code selection method" (CSM) and its most important property is that it causes (statistically) similar inputs to map to similar codes, which is referred to as the SISC property. In the case of a two-layer system, an input layer and a chunking layer, each comprised of binary units, the similarity measure over both input code space and the chunk code space is simply size of intersection. SISC is very helpful in enabling the system to retrieve the closest-matching stored sequence (i.e., activate the chunk code of said sequence) without requiring serial search over stored codes. To illustrate the essential principles of the CSM, we cast it first in the context of a two-layer system and a purely spatial pattern storage and retrieval scenario in which the choice of code to activate at L2 depends only on the bottom-up (U) signals from the input layer. Note that this simple scenario does not require OP. Thus, the second-layer codes will consist of one winner per CM. Following this basic description of the CSM, we will generalize it to the multilayer case and provide examples of chunking (and retrieving) two-item sequences.

A single iteration of the CSM involves two rounds of competition in the CMs of L2. The first round is a "hard WTA competition." The purpose of the first round is to compute a global familiarity measure, G, of the input pattern. G then drives a global modulation of the L2 unit activation function in preparation for the second competitive round, which is a "soft WTA competition," the intent of which is that: a) as G goes to 1 (indicating a completely familiar input), the probability that the unit with the highest input summation in a CM wins approaches 1, and; b) as G goes to 0 (indicating a completely novel input), all units in a CM become equally likely to win (regardless of their input summations). This policy ensures, statistically, the SISC property. The steps of CSM-1 are as follows.

1. Each L2 unit i computes its raw input summations, u(i).

$$u(i) = \sum_{j \in \alpha_n} w(j,i) \quad \text{(Eq. 1)}$$

where $\alpha_n$ is the current input (L1) pattern. Because unit activations are binary, we can simply sum the weights, w(j,i), which are also binary.

2. Normalize u(i) to [0..1], yielding V(i).

$$V(i) = u(i)/S \quad \text{(Eq. 2)}$$

S is the number of active units in the input pattern. V(i) is a local measure of support, or likelihood, that L2 unit i should be activated. It reflects how well unit i's receptive field (RF), specified by its afferent weight vector, matches the current input vector.

3. (Round 1 competition) The maximum V(i), $\hat{V}_x$, is found in each of the $Q_2$ CMs.

$$\hat{V}_x = \max_{i \in C_x} \{V(i)\} \quad \text{(Eq. 3)}$$

where x indexes the CMs and i indexes the units in a CM, $C_x$.

4. Average the $Q_2$ $\hat{V}_x$ values, yielding G, a global measure of the familiarity of the current input.

$$G = \sum_{x=1}^{Q_2} \hat{V}_x / Q_2 \quad \text{(Eq. 4)}$$

5. The expansivity, $\eta$, of the probabilistic activation function (which is implemented via steps 6-8) is set as an increasing nonlinear function of G (Eq. 5, expressed as a table).

| G | 0.0 | 0.2 | 0.4 | 0.6 | 0.8 | 1.0 | (Eq. 5) |
|---|---|---|---|---|---|---|---|
| $\eta$ | 0 | 0 | 0.2 | 5 | 12 | 100 | |

$\eta$ corresponds to sigmoid height (in Eq. 6). The idea is to increase the range of "relative win likelihoods," $\psi(i)$ (defined in Step 6) over any given CM's units as G goes to one. This in turn, serves to nonlinearly exaggerate the difference in the "final win probabilities" (Eq. 7) between L2 units with low and high V values. The specific parameters of any instance of the G-to-$\eta$ mapping will determine the specifics of the relation between input similarity and code similarity, i.e., the expected code intersection as a function of input similarity. The specific $\eta$ values in Eq. 5 were chosen to yield the $\rho$-distributions in the examples of FIGS. 8 and 9.

6. The V values of all units in all CMs are then passed through the sigmoidal activation function (Eq. 6) whose shape/scale reflects G. Again, particular parameter values affect the relation of input similarity to code similarity (and therefore, storage capacity): values of $\lambda=28$ and $\phi=-5$ produce the V-to-$\psi$ mappings in FIG. 9. As noted above, within each CM, the output variable, $\psi(i)$, can be viewed as a relative likelihood that unit i should be chosen winner. The $\psi$-distributions in each CM are normalized to final probabilities in Step 7.

$$\psi(i) = \frac{\eta}{1 + e^{-(\lambda V(i) + \phi)}} + 1 \quad \text{(Eq. 6)}$$

When G=1 (perfectly familiar), $\eta$ is maximized (in Eq. 5), which maximizes relative and total (once normalized, via Eq. 7) probabilities of winning for units with the maximum V value in their respective CMs. In contrast, when G=0 (completely novel), $\eta=0$, which collapses the sigmoid to the constant function, $\psi=1$, thus making all units in a CM equally likely to win. This causes the expected intersection of the code being chosen in the current instance with any previously assigned code to be at chance level. In general, this modulation of the sigmoid activation function tends toward "code completion" in proportion to the familiarity of the input and "code separation" in proportion to its novelty.

7. Transform relative likelihood distribution ($\psi$) in each CM to true probability distribution ($\rho$).

$$\rho(i) = \frac{\psi(i)}{\sum_{k \in CM} \psi(k)} \quad \text{(Eq. 7)}$$

8. (Round 2 competition) Choose an L2 code by drawing a winner from the $\rho$-distribution (soft max) in each CM. Thus, choosing an L2 code is actually performed as $Q_2$ separate draws. When G=0, these draws are statistically independent, as in FIGS. 8 and 9D. As we consider increasingly familiar inputs, i.e., for G approaching one (and, assuming the system is still operating in a regime where crosstalk is sufficiently low), the draws become increasingly correlated (dependent), as can be seen in going from FIGS. 9C to 9B to 9A.

Figure 8:
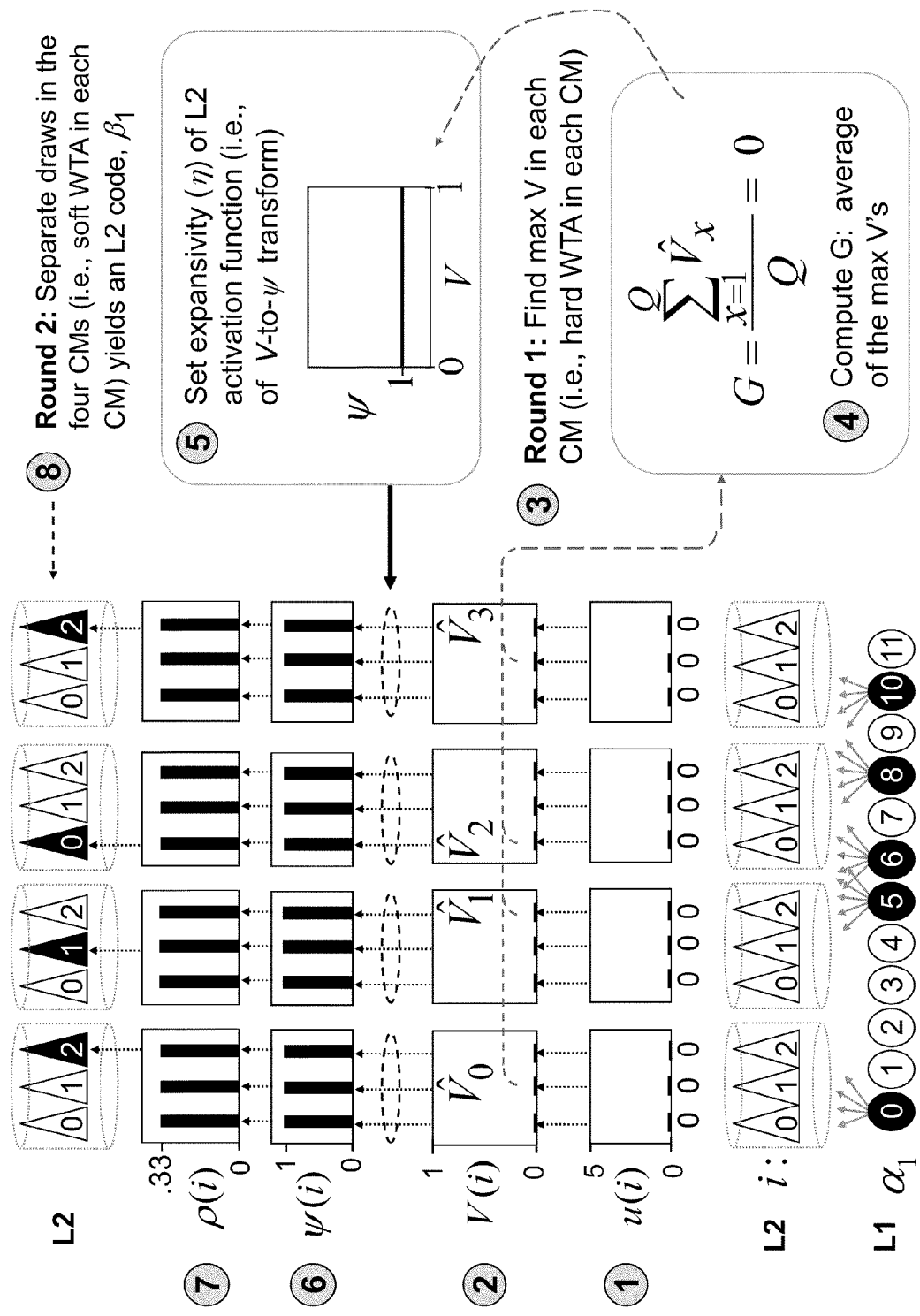
FIG. 8 is a graphic illustration of version 1 of the "code selection method," CSM-1. Circled numbers refer to method steps in text. Shown here is the case of the first input, a1, presented to the model. The method detects that a1 is completely unfamiliar, i.e., G is computed to be 0, and sets the L2 activation function to a constant function (thick black line), which makes the choice of winner in each CM completely random (all units are equally likely to be chosen), and thus, the overall L2 code, b1, also completely random.

FIG. 8 graphically illustrates the operation of CSM-1 in the case of the system being presented with a first spatial input, $\alpha_1$. The gray arrows indicate that the U signals propagating from the active L1 units will be traversing connections with weight zero. This leads to unnormalized (u) and normalized (V) input summations of zero for all 12 L2 units (Steps 1,2). In Step 3, the max V, $\hat{V}$, in each CM is found (ties broken at random). In Step 4, G is computed as the average of the $\hat{V}$ values: in this case all the $\hat{V}$ are zero, so G=0. In Step 5, the value, G=0, maps to $\eta=0$, which causes the activation function of the L2 units to collapse to the constant function, $\psi=1$. In Step 6, each L2 unit applies this activation function to its V value, yielding the uniform relative likelihood distribution in each CM. In Step 7, the relative likelihood function in each CM is normalized to a true probability ($\rho$) distribution, which in this case, is again uniform. Finally, in Step 8, a winner is drawn in each CM, resulting in a random L2 code, e.g., $\beta_1$.

FIG. 9 demonstrates that CSM-1 realizes the SISC property by considering four possibilities (A-D) for the second input presented to the system of FIG. 8. These four inputs, $\alpha_2$-$\alpha_5$, range from being identical to $\alpha_1$ (completely familiar) to having zero overlap with $\alpha_1$ (completely unfamiliar). To save space, the panels of FIG. 9 use an abbreviated version of the format of FIG. 8. Most noticeably, the intermediate variable, $\psi$ (relative likelihood), is not shown. However, the transform from V through to $\rho$ should still be clear. Black U connections are ones that were increased to one when $\alpha_1$ was learned (FIG. 8). The overall message of FIG. 9 is as follows. Working from panel A to D, the inputs have progressively lower similarity (intersection) with $\alpha_1$: L1 units not in common with $\alpha_1$ are shown with cross-hatched background. As G drops, the sigmoid expansivity drops (note the changing $\psi$ scale). Thus, the $\rho$-distributions become progressively flatter, which in turn results in L2 codes, $\beta_2$-$\beta_5$, having progressively smaller intersection with $\beta_1$. L2 units not in common with $\beta_1$ also shown with cross-hatched background.

Figure 9B:
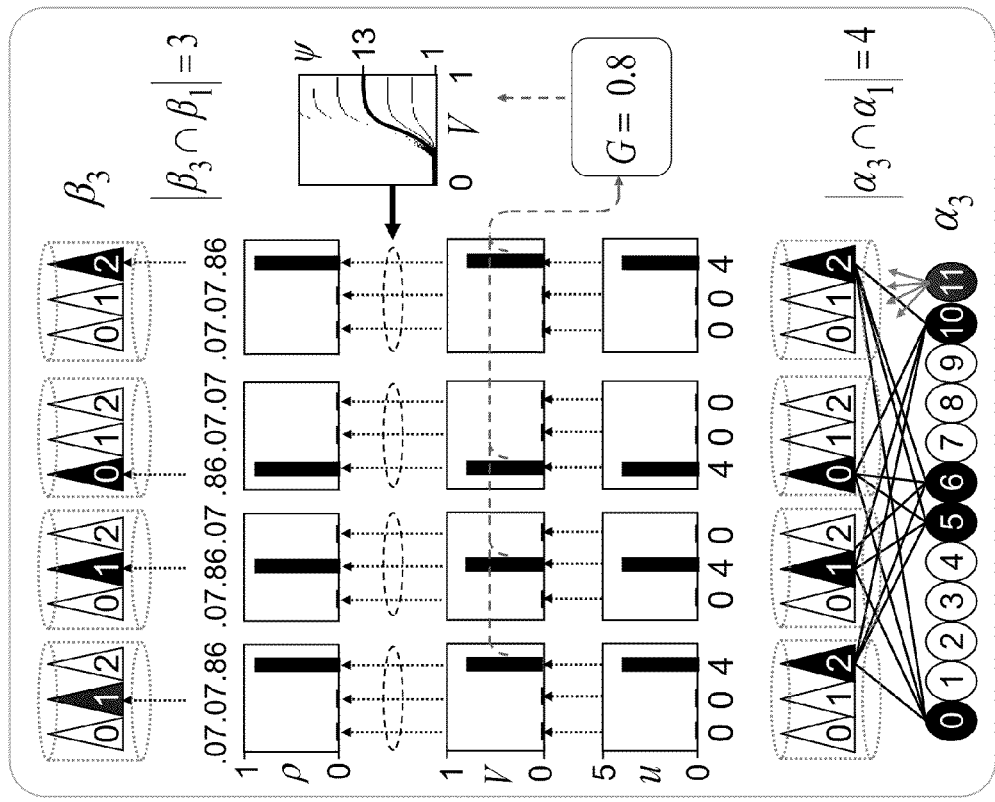
FIG. 9 shows that the CSM possesses (enforces) the "similar inputs map to similar codes" (SISC) property.
Figure 9A:
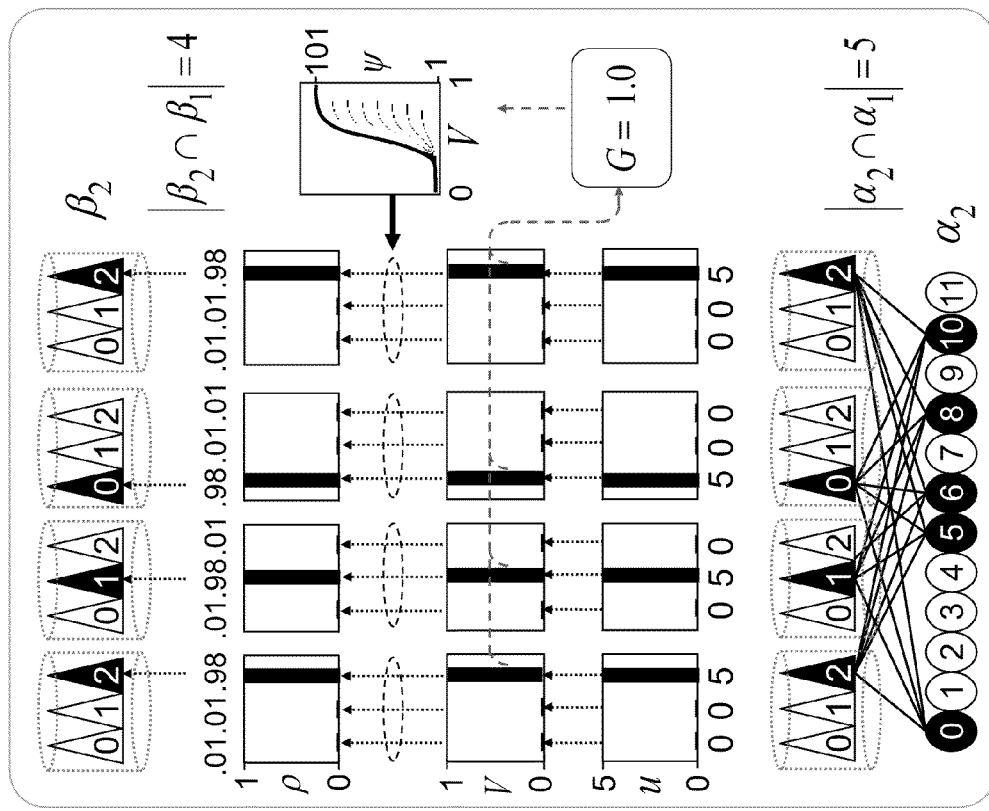
Figure 9C:
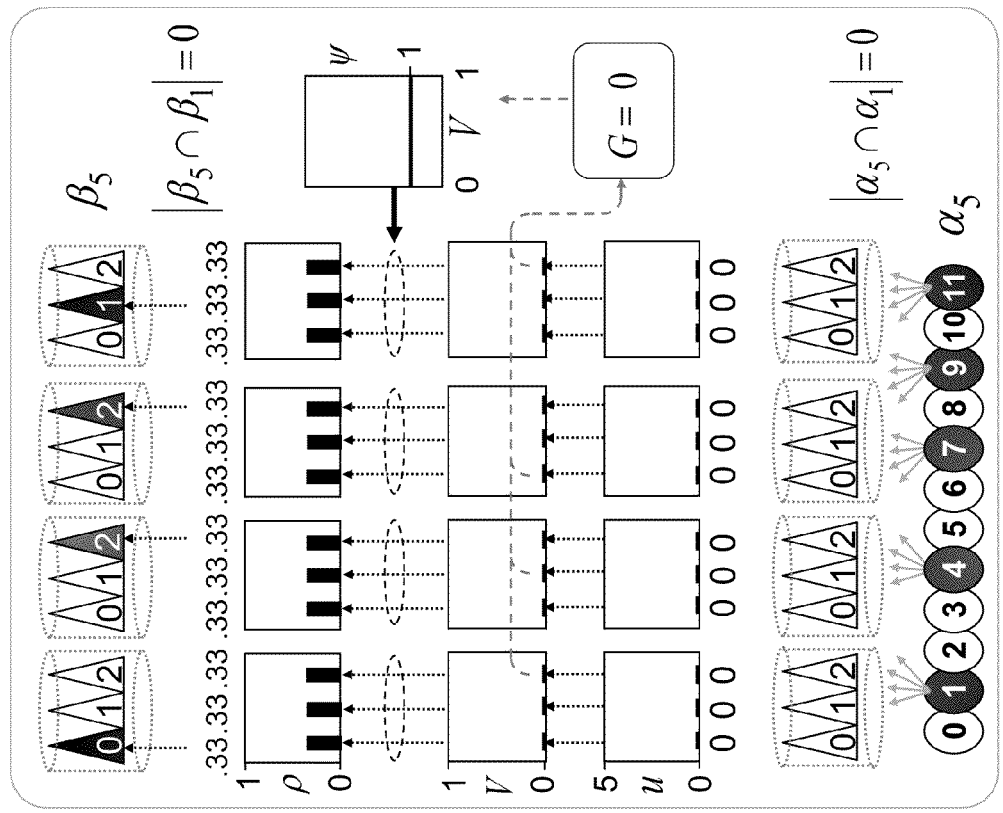
Figure 9D:
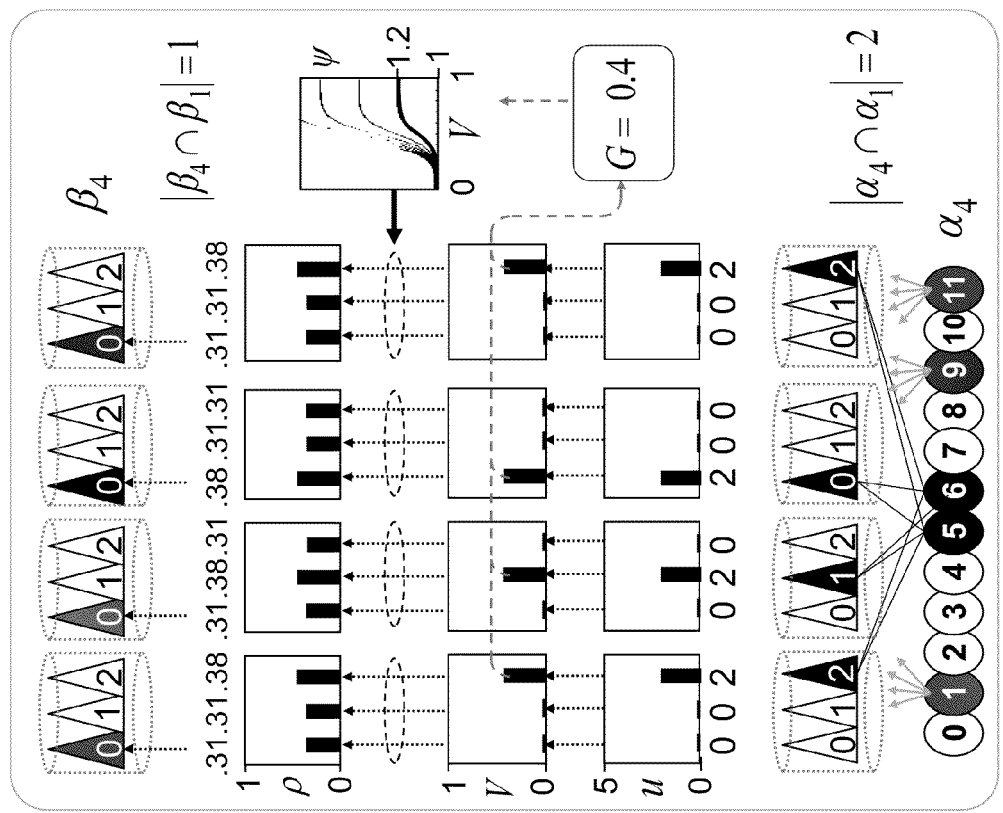

FIG. 9A shows the case of presenting a completely familiar input again, and is thus a recognition test trial, demonstrating retrieval. This leads, via CSM-1 steps 3 and 4, to G=1, which yields, via steps 5 and 6, the expansive nonlinear V-to-$\psi$ mapping shown (red sigmoid). This nonlinearity is applied to every L2 unit, yielding the highly peaked $\rho$-distributions shown. Finally, one unit is drawn in each CM. The probability of drawing the correct unit in any single CM is approximately 98%. Of course, what's crucial in this case, i.e., when the input is completely familiar (G=1), is that the entire correct L2 code is reactivated. In this case, that probability is $(0.98)^4 \approx 92\%$. Thus, the familiarity, G, which depends on the entire L2 layer and is thus global information, influences the local activation functions so as to produce the desired overall result, in this case, reactivation of the code (memory trace), $\beta_1$, of the familiar input pattern, $\alpha_1$. The explanations of the remaining panels follow that of FIGS. 8 and 9A. In going from panel 9B to 9D, one can readily see decreasing intersection with $\alpha_1$, decreasing u and V values, decreasing G, decreasing sigmoid expansivity, progressively flatter $\rho$-distributions, and ultimately, decreasing intersection with $\beta_1$.

Before leaving FIG. 9, some important points are underscored here. First, while the $\rho$-distributions become flatter as G decreases, the units comprising the code of the most similar previously learned input (here, $\alpha_1$) remain most likely to win in their respective CMs. If we simply deterministically chose the unit with maximum V(i) in each CM, we would have chosen the same L2 code, $\beta_1$, in response to all four inputs, $\alpha_2$-$\alpha_5$. Thus, the computation of a quantity, G, which depends on all the CMs is essential to achieving the SISC property. It constitutes a channel through which information transfers between all the L2 units.

Second, learning is single-trial and involves only one iteration of CSM-1. This is largely facilitated by the fact that when a given input-code association, $\alpha_j$-$\beta_j$, is learned, each of $\beta_j$'s L2 units simultaneously has its afferent weight from all of $\alpha_j$'s L1 units increased. The effect of these simultaneous correlated increases allows a rapid, even single-trial, formation of an association, even if the individual weight increases are small.

Third, FIG. 9A shows that recognizing an exact instance of a previous input also requires only one iteration of CSM-1. Although this example does not directly show it, this holds for recognition of non-exact matches as well. That both learning and recognition require only a single CSM-1 iteration is especially significant since, as can readily be seen, none of CSM-1's steps involves iterations over stored codes: thus, the time it takes for CSM-1 to either store a new input or retrieve the closest matching stored input remains constant as the number of stored codes increases. This does not imply that an infinite number of codes can be stored: of course, the system has finite storage capacity. This capacity will be characterized in future research, but should be similar to other sparse associative memories (18-22).

Provided below are illustrative examples of OP's two processes, learning and retrieving. For maximal simplicity, these examples involve sequences consisting of only two items. In reality, as indicated in the Summary of the Invention and elsewhere, in various of its aspects, OP can assign unique chunk codes to sequences of any number of items and retrieve said sequences when queried.

Because these examples will involve the chunking of sequences, item order will now become important. Therefore we explicitly include the second layer seen in FIG. 6, L2, which also uses SDR and which has an H matrix, which will encode the temporal relations between successive items. As stated earlier, codes in this L2 layer will be termed, moment codes. Thus, in these final examples, L3 will be the chunking layer. Before proceeding directly to the examples, we must describe the variation of the CSM that is entailed by the use of the H connections in L2 (and in general, though not in this example, in L3) and the use of OP in L3. Note that we will move to a more uniform notation to denote codes at different layers: rather than use a different Greek letter for each layer (e.g., $\alpha$ and $\beta$ as in the prior example), we now denote a code in layer J as, $\xi_J$. The code in layer J at time, t, will be denoted, $\xi_J(t)$.

This generalized version of CSM-1 is called CSM-2. Its steps are as follows.

1. Each L2 (and L3) unit i computes its raw bottom-up (U) summation, u(i), and its raw horizontal (H) summation, h(i).

$u(i) = \Sigma_{k \in \xi_{j-1}(t)} w(k,i)$ (Eq. 1a)

$h(i) = \Sigma_{k \in \xi_j(t-1)} w(k,i)$ (Eq. 1b)

where $\xi_{j-1}(t)$ is the currently active code in the level below, $L_{j-1}$, and $\xi_j(t-1)$ is the previously active code in the same level. Because unit activations are binary, we can simply sum the weights, w(k,i), which are also binary.

2. Normalize u(i) and h(i) to [0..1], yielding U(i) and H(i):

$U(i) = u(i)/Q_{j-1}$ (Eq. 2a)

$H(i) = h(i)/(Q_j - 1)$ (Eq. 2b)

Normalization is facilitated because the coding rate, i.e., the number of active units comprising a code, of each internal level $L_j$ is fixed at $Q_j$. The number of active units comprising an input pattern at $L_1$, denoted $Q_1$, cannot be assumed fixed. However, we assume that $Q_1$ is communicated to $L_2$ on each time step, allowing $L_2$ units to normalize their U input summations. Note, in Eq. 2b, normalization is by $Q_j - 1$ rather than $Q_j$. This is because H-matrix connectivity is slightly less than all-to-all: each $L_j$ ($j \geq 2$) unit receives an H connection from all other $L_j$ units except those in its own CM.

3. Each unit then computes an overall local measure of support (evidence), V(i), that it should be activated. In general (i.e., for all but the first time step of a sequence), this is done by multiplying U(i) and H(i). On the first time step, there are no incoming H signals: in that case, V(i)=U(i).

$$V(i) = \begin{cases} H(i) \times U(i) & t \geq 2 \quad \text{(Eq. 3a)} \\ U(i) & t = 1 \quad \text{(Eq. 3b)} \end{cases}$$

V(i) is a spatiotemporal measure, reflecting how well the unit's receptive field (specified by its afferent U and H weights) matches its current vector of inputs, which represents the current moment.

4. (Round 1 competition) The maximum V(i), $\hat{V}_x$, is found in each of the $Q_j$ CMs.

$$\hat{V}_x = \max_{i \in C_x} \{V(i)\} \quad \text{(Eq. 4)}$$

where x indexes the CMs and i indexes the units in a CM, $C_x$.

5. Average the $Q_j$ $\hat{V}_x$ values, yielding $G_j$, a global measure of the familiarity of the current input.

$$G_j \equiv \Sigma_{x=1}^{Q_j} \hat{V}_x / Q_j \quad \text{(Eq. 5)}$$

6. The expansivity, η, of the probabilistic activation function (which is implemented via steps 7-9) is set as an increasing nonlinear function of $G_j$ (Eq. 6, expressed as a table).

| G | 0.0 | 0.2 | 0.4 | 0.6 | 0.8 | 1.0 |
|---|---|---|---|---|---|---|
| η | 0 | 0 | 0.2 | 5 | 12 | 100 |

7. The V values of all units in all CMs are then passed through the sigmoidal activation function (Eq. 6) whose shape/scale reflects G. The ψ-distributions in each CM are normalized to final probabilities in Step 8.

$$\psi(i) = \frac{\eta}{1 + e^{-(\lambda V(i) + \phi)}} + 1 \quad \text{(Eq. 7)}$$

8. Transform relative likelihood distribution (ψ) in each CM to true probability distribution (ρ).

$$\rho(i) = \frac{\psi(i)}{\sum_{k \in CM} \psi(k)} \quad \text{(Eq. 8)}$$

9. (Round 2 competition) This step differs between internal (i.e., SDR-using) layers that use OP and those that do not. In the examples to follow, L3 uses chunking and L2 does not.
   a. (for layers $L_j$ not using OP) Choose an $L_j$ code by drawing one winner from the ρ-distribution (soft max) in each CM.
   b. (for layers $L_j$ using OP) Make k draws from the ρ-distribution (soft "k-max") in each CM, where k will vary according to a paring schedule similar to that described in the Summary of the Invention. In the examples to follows, at L3, k=2 on the first time step (i.e., when the first sequence item is presented) and reduces to k=1 on the second time step. Note in particular that when the first code is activated in a chunking layer (i.e., the first overcode), the population from which the winners are drawn is the entire set of units comprising the CM. However, on subsequent time steps at which a paring event occurs, the population from which the winners are drawn is the set of units comprising the currently active overcode.

Using a three-level system, we present examples of OP doing sequence chunking/retrieval. FIG. 10 shows the presentation and learning of the sequence [HE]. FIG. 11 shows that if we subsequently present the reversed sequence [EH], which of course is novel, the system assigns a unique chunk to it. FIG. 12 shows that if we subsequently re-present [HE], the system correctly recognizes it.

Note that the graphical conventions in FIGS. 10-12 differ from earlier figures in that we show the system at three points in time while processing each item: after $L_2$ code selection (e.g., FIG. 10A), after $L_3$ code selection (e.g., FIG. 10B), and at the end of the time step (e.g., FIG. 10C). We show U connections as lines: gray, for a newly increased weight, black, for a permanently increased weight, and dotted gray for a weight that has been decreased back to zero. Horizontal weights are shown as arcs with triangles at the end.

In FIG. 10A (t=1a), the $L_1$ code for item H, denoted $\xi_1(H)$, is active, and CSM-2 has executed at $L_2$. FIG. 10D shows the operation of CSM-2 at $L_2$. The four CMs of $L_2$ correspond in row-major order to the four boxes across each row. Each box shows the distribution of values (U, H, V, and ρ) over the CM's four units (also in row-major order). Box height in all four rows (U, H, V, and ρ) is one, since these are all normalized values. The H row is dimmed here because H connections are not used on the first item of a sequence; i.e., Eq. 3b is used. All U and thus, V, values are zero. Thus, $G_2=0$, indicating complete unfamiliarity (novelty), which yields (via CSM-2 steps 7 and 8) a V-to-ψ map that is a constant function. Finally, this yields uniform ρ-distributions in each CM. The indexes of the randomly chosen winner appears above each CM's box. This $L_2$ code represents the moment [H] and is denoted $\xi_2([H])$.

FIG. 10B (t=1b) shows the state after CSM-2 has executed in $L_3$, the details of which are shown in FIG. 10E. Again, H connections are ignored, U and V values are all zero, resulting in $G_3=0$ (novelty) and thus, flat ρ-distributions. Since this is the first sequence item (t=1) at a chunking level, the system chooses two units (without replacement) in each CM; again, the winning indexes are shown above each CM's box. This is an overcode for the moment [H], denoted $\xi_3([H\_])$. The underscore (also bolded) is a notational placeholder that will be filled in at t=2, when the chunk code is pared from this overcode. FIG. 10B also shows a subset of the increased U weights (gray lines) that comprise the $\xi_1(H)$-to-$\xi_2([H])$ association, and H signals originating from $\xi_2([H])$. These H signals are gray indicating that they are traversing a horizontal weight matrix within which no learning has occurred yet. They will arrive back at (recur to) $L_2$ at t=2.

FIG. 10C (t=1c) shows the state at the end of the first time step. The portion of the $\xi_2([H])$-to-$\xi_3([H\_])$ association arising from one of the four $\xi_2([H])$ units is shown (gray lines). H signals have arisen from $\xi_3([H\_])$ (from all eight units, though we show only a subset). The $\xi_1(H)$-to-$\xi_2([H])$ associations have become permanent (black lines). However, the $\xi_2([H])$-to-$\xi_3([H\_])$ association remains labile (gray), which is necessary because of the paring and concomitant weight decreases that will occur at t=2.

FIG. 10F (t=2a) shows the state after the second item, E, has replaced H at $L_1$; the units that have just turned off (since they are not in the pattern, 'E') are shown in gray. The H signals have recurred (not shown), and CSM-2 has executed as $L_2$. Note that the overcode is still active here because $L_3$ units persist for two time steps ($\pi_3=2$). As can be seen in FIG. 7I, the U-distributions are not flat; specifically, the four units of $\xi_2([H])$ have V=7/11, since $\xi_1(H)$ and $\xi_1(E)$ have seven units in common. Since t=2, H signals are present. However, they are all zero. Thus, by Eq. 3a, V=0 for all units in all CMs.

Thus, $G_2$=0 and all ρ-distributions are flat. A new $L_2$ code, denoted $\xi_2$([HE]), is chosen randomly (black units) as the representation of moment, [HE]. The previously active $L_2$ code is shown in gray: note that those units are now inactive.

It is important to note that the $L_2$ units comprising $\xi_2$([HE]) are simultaneously learning a confluence of U and H signals, representing that particular spatiotemporal moment. These units are bound together as that code not because they have increased their weights onto each other, but because they have all had their afferent weight vectors modified in the same way. Thus, should another instance of moment [HE] arise in the future, then the same pattern of U and H signals will exist for each of the units comprising $\xi_2$([HE]), and so it will, with high probability, be reactivated as a whole.

FIG. 10G (t=2b) shows the state after CSM-2 has executed in $L_3$, the details of which are shown in FIG. 10J. Since the new $L_2$ code, $\xi_2$([HE]), is now active, the H wts from $\xi_2$([H]) to $\xi_2$([HE]) are increased; three of these 12 increased H wts are shown (black arcs). None of the U wts from $\xi_2$([HE]) have been increased yet, nor have any of the H wts from $\xi_3$([H_]). These conditions are reflected in the all-zero U, H, and thus V, vectors, which yields $G_3$=0 and flat ρ-distributions. Because, t=2 is a paring step at $L_3$, one of the two active units in each CM is chosen to remain active (black units) in each $L_3$ CM, while the other is pared out (light gray units). Because all ρ-distributions are flat, these choices are random. The surviving four $L_3$ units comprise the chunk code for the two-item sequence [HE]. FIG. 10G also shows the new U learning from $\xi_1$(E) to $\xi_2$([HE]), which becomes permanent by the end of the time step (FIG. 10H).

FIG. 10H (t=2c) shows the state at the end of the second time step. The H wts comprising the $\xi_2$([H])-to-$\xi_2$([HE]) association are made permanent. The subset of the U-association, $\xi_2$([H])-to-$\xi_3$([H_]), onto the four units that survived paring to become the chunk code, $\xi_3$([HE]), becomes permanent (such U wts are shown as gray lines in FIG. 10C but as black lines in FIG. 10H). The subset of $\xi_2$([H])-to-$\xi_3$([H_]) onto the four pared-out units (light gray) is erased (such U wts are shown as gray lines in FIG. 10C but as dotted gray lines in FIG. 10H). Also, both the U wts from $\xi_2$([HE]) to $\xi_3$([HE]) and the $L_3$ H wts from $\xi_3$([HE]) to $\xi_3$([HE]), an autoassociation, are increased (black). All of these weights can be assumed to become permanent in the immediately ensuing time period because: a) none of their origin or terminus units will be pared out.

FIG. 11 shows that the system assigns order-dependent chunk codes. In particular, a unique chunk code is assigned to [EH] after having learned [HE]. Note that we will be more minimalist in our descriptions of FIGS. 11 and 12.

FIG. 11A shows presentation of item E as the first sequence item. Despite the fact that this is a novel moment (i.e., the system has never experienced E as a sequence-initial item), the system does not detect this. This is because CSM-2 uses only U inputs to compute familiarity at t=1 (Eq. 3b). Since E has been previously associated with an $L_2$ code, $\xi_2$([HE]) (in the previous example), the $L_2$ units comprising that code have maximal U values, U=1, as shown in FIG. 11D. Furthermore, since $\xi_1$(H) and $\xi_1$(E) share seven units, the $L_2$ units comprising $\xi_2$([H]) also have substantial U values (7/11). Since all four $L_2$ CMs have a unit with V=1, $G_2$=1 (perfect familiarity), resulting in a highly expansive V-to-ψ map, and reactivation of $\xi_2$([HE]), with high probability. Thus, $\xi_2$([E])=$\xi_2$([HE]). No new learning occurs here because there are no opportunities for new learning.

FIG. 11B (t=1b) shows the state after CSM-2 has executed at $L_3$. Again, perfect familiarity is detected since H wts are ignored at t=1 and $\xi_2$([E]), a.k.a. $\xi_2$([HE]), has previously been U-associated with the chunk code, $\xi_3$([HE]). There is a unit in each $L_3$ CM with V=1, as shown in FIG. 11E, hence $G_3$=1. This makes it extremely probable that $\xi_3$([HE]) will be included as part of the overcode, $\xi_3$([E_]). The second winner chosen in each CM is chosen at random; thus $\xi_3$([E])≠$\xi_3$([H_]), even though they both contain $\xi_3$([HE]). FIG. 11C shows that there is some new learning (gray lines), due to the randomly chosen second winners, which have not previously been U-associated with $\xi_2$([E]).

Figure 11H:
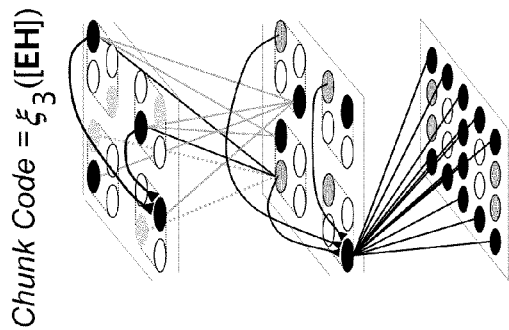
FIG. 11 shows that OP assigns order-dependent chunk codes. When [EH] is presented, after [HE] has been learned, a new chunk code is assigned to [EH].
Figure 11G:
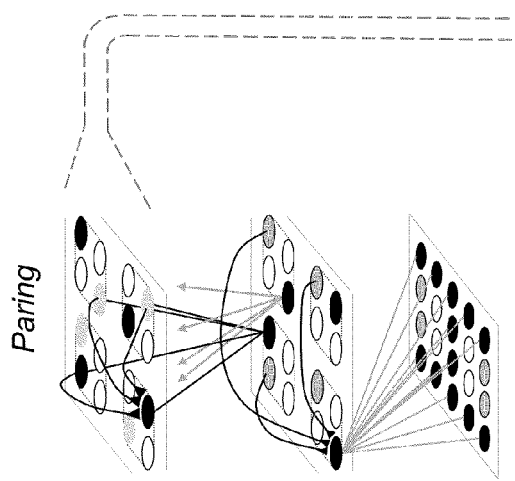
Figure 11F:
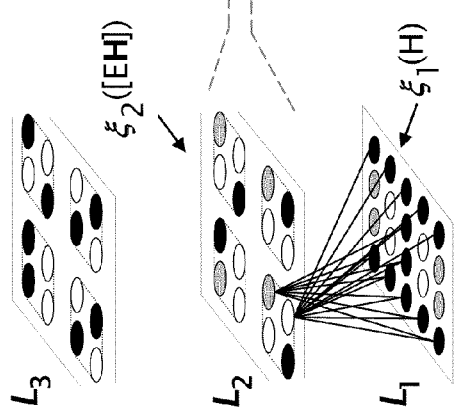
Figure 11J:
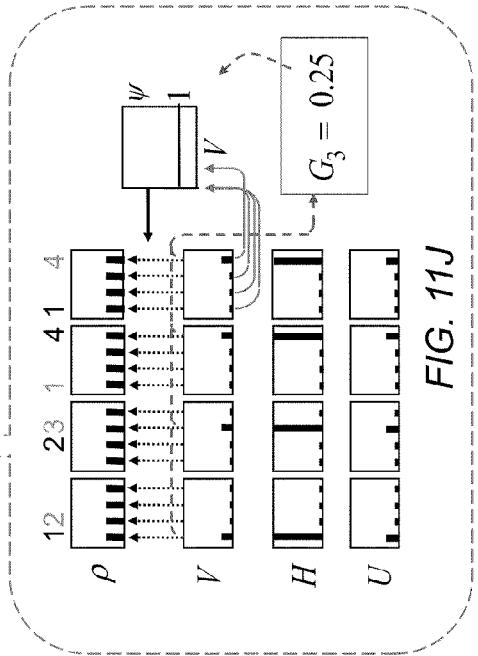
Figure 11I:
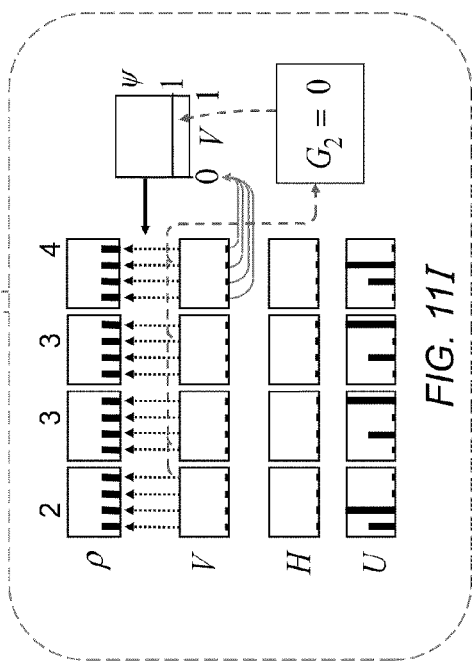

FIG. 11F (t=2a), shows the state CSM-2 has executed at $L_2$. Since $\xi_1$(H) has been associated with an $L_2$ code, $\xi_2$([H]) (see FIG. 10), those $L_2$ units have U=1. However, H wts are now also used to compute V (Eq. 3a). Since the four units comprising $\xi_2$([H]) have never been active after any other $L_2$ code, they all have H=0. Thus, V=0 for all $L_2$ units as shown in FIG. 11I. Consequently, $G_2$=0 and the ρ-distributions are flat, resulting in a novel $L_2$ code, $\xi_2$([EH]), for moment, [EH]. Note that by chance, $\xi_2$([EH]) shares one unit, $a_1$, with $\xi_2$([H]).

FIG. 11G (t=2b) shows the state after CSM-2 executes at $L_3$. Since $\xi_2$([EH]) is almost entirely new, there is new BU learning from $L_1$ to $L_2$, (a subset of which is shown with gray lines) and horizontal learning from $\xi_2$([E]) to $\xi_2$([EH]) (a subset of which is shown: black arcs). In FIG. 11J, note the four units (one in each $L_3$ CM) with U=0.25. This results from the unit, $a_1$, common to $\xi_2$([H]) and $\xi_2$([EH]). These four units, which comprise the chunk code, $\xi_3$([HE]), also have H=1: this is due to their "autoassociating" in the last example (FIG. 10). This results in $G_3$=0.25, which for yields flat ρ-distributions. Since this is a paring step, one of the two active units in each $L_3$ CM will be chosen. And, since, the ρ-distributions are flat, we make the statistically reasonable choice that the unit for which V=0.25 is chosen winner in two of the CMs (a and c) and the other unit is chosen in the other two CMs (b and d). The result is a new chunk code, $\xi_3$([EH]), which nevertheless has a sizable intersection (50%) with $\xi_3$([HE]). Note that it is reasonable that these two chunks should have some overlap given that they represent sequences that are similar, in fact identical, in terms of which items they contain.

FIG. 11H (t=2c) shows some new learning between $L_2$ and $L_3$ (due to the new $L_2$ and $L_3$ codes). This example establishes that the system assigns unique chunk codes to sequences that differ only in the order of their items.

FIG. 12 shows that presenting a second instance of a sequence, [HE], leads to recognition, i.e., causes the correct codes to activate at all layers and in the right order. Broadly, one can see that all four executions of CSM-2 detect maximal familiarity ($G_2$=1 or $G_3$=1) and ultimately result in reactivation of the code whose units are responsible for those G values. There is some new temporary learning (gray) between $L_2$ and $L_3$ (due to the randomly chosen second winners in each $L_3$ CM at t=1. However, this learning is erased (in FIG. 12H) due to the paring (dotted gray lines). As appropriate for presentation of a completely familiar input pattern, there is no new permanent learning in this example. That is, there are transient weight increases in service of the OP process, but they are erased (pared out) by the end of the sequence.

FIG. 12A (t=1a), shows the state after item H has been presented and CSM-2 has executed at $L_2$. As shown in FIG. 12D, at least one unit in each L2 CM has U=1, and therefore, V=1. Thus, $G_2$=1, causing the V-to-ψ map to be very expansive, resulting in ρ=1 for the unit in each CM, which was a member of $\xi_2$([H]) and ρ≈0 for the other three units in each CM. Thus, $\xi_2$([H]) is reinstated with very high probability. In FIG. 12B (t=1b), the U signals arising from $\xi_2$([H]) have given rise to an overcode, $\xi_3$([H_]), which includes the chunk, $\xi_3([HE])$, learned on the first presentation of [HE] (in FIG. 10). The second winner in each $L_3$ CM is chosen at random. FIG. 12C shows a subset of the new U-learning (gray lines) occurring at this time.

FIG. 12F (t=2a) shows the state after the second item "E" has replaced "H" at $L_1$ and CSM-2 has executed at $L_2$. The four units comprising $\xi_2([HE])$ have H=1 and U=1, resulting in $G_2$=1, as shown in FIG. 12I. In other words, the spatiotemporal (H and U) receptive fields (RFs) of each of these four units matches exactly $L_2$'s current overall spatiotemporal context. Other $L_2$ units have non-zero U values but zero H values. Thus, these units have V=0 (by Eq. 3a) and are thus squashed towards zero by the highly expansive V-to-$\psi$ map. Ultimately, the correct unit in each CM, i.e., the unit with V=1, wins with probability near one, and the correct code, $\xi_2([HE])$, survives paring, also with very high probability.

FIG. 12G shows the state after the U and H signal vectors have arrived at $L_3$ and CSM-2 has executed at $L_3$. As was the case for $L_2$, the RFs of each of the four units comprising $\xi_3([HE])$ exactly matches $L_3$'s overall spatiotemporal context. This leads to $G_3$=1, as shown in FIG. 12J, and, as suggested by the $\rho$-distributions, to paring from $\xi_3([H\_])$ to $\xi_3([HE])$. FIG. 12H shows the erasing (dotted gray lines) of the learning that occurred at t=1 (gray lines in FIG. 12C). More to the point, it shows $\xi_3([HE])$ being left active in $L_3$, demonstrating recognition of a familiar sequence.

As noted earlier herein, OP is fully generalizable to a hierarchy having an arbitrary number of layers. In this case, if both persistence and paring time increases with each layer, the system can assign unique chunk codes to sequences of any predetermined length (i.e., once this desired length is defined, the number of layers needed can also be set. Table 1, describes a further generalized version of code selection method, called CSM-3, which combines all three input sources that an internal (but not topmost) layer may have, U, H, and D. There are several additions/changes from CSM-2. First, CSM-3 Step 1 now has three sub-steps, for u(i), h(i), and d(i) Likewise, CSM-3 Step 2 now has three separate normalization sub-steps, for U(i), H(i), and D(i). Finally, Step 3, which computes a unit's overall degree of support now has three sub-cases, depending on which inputs are available. If only U signals are available, then V(i)=U(i). If U and H signals are available, then U(i) and H(i) are multiplied to produce V(i), and if all three signals are available, then all three are multiplied to produce V(i). On each cycle of CSM-3, each unit evaluates how well its current overall (i.e., U, H, and D) receptive field (which is determined by the learning that has occurred on its afferent connections thus far) matches its current overall input. The rest of the method is the same as CSM-2.

TABLE 1

A further generalized CSM, CSM-3

| Equation | Short Description |
|---|---|
| 1  $u(i) = \Sigma_{k \in \xi_{j-1}(t)} w(k,i)$<br>$h(i) = \Sigma_{k \in \xi_{j}(t-1)} w(k,i)$<br>$d(i) = \Sigma_{k \in \xi_{j+1}(t)} w(k,i)$ | Compute weighted input summations separately for bottom-up (u), horizontal (h), and top-down (d) inputs. $\xi_{j-1}(t)$ is the currently active code in the level below, $L_{j-1}$, and $\xi_j(t-1)$ is the previously active code in the same level. Since unit activations are binary, we can simply sum the weights, w(k,i), which are also binary. |
| 2  $U(i) = u(i) / Q_{j-1}$<br>$H(i) = h(i) / (Q_j - 1)$<br>$D(i) = d(i) / Q_{j+1}$ | Separately normalize each of the three inputs. $Q_J$ is the number of CMs in Level J, or if Level J is an input level, $Q_J$ is the number of active input units in an ($\alpha$) pattern, which is constant. |
| 3  $V(i) = \begin{cases} U(i) \times H(i) \times D(i) & t > J + 1 \\ U(i) \times H(i) & t = J + 1 \\ U(i) & t = J \end{cases}$ | The three normalized input signals are multiplied to produce a unit's overall degree of support, V(i). At each time step and at each level, the appropriate form of this equation is used depending on what signals are available. |
| 4  $\hat{V}_x = \max_{i \in C_x} \{V(i)\}$ | Find max V, $\hat{V}_X$, in each WTA CM, $C_X$. |
| 5  $G_j \equiv \sum_{x=1}^{Q_j} \hat{V}_x / Q_j$ | Compute $G_j$ as the average $\hat{V}$ value over the Q WTA CMs of Level J. |
| 6  <table><tr><td>G</td><td>0.0</td><td>0.2</td><td>0.4</td><td>0.6</td><td>0.8</td><td>1.0</td></tr><tr><td>$\eta$</td><td>0</td><td>0</td><td>0.2</td><td>5</td><td>12</td><td>100</td></tr></table> | Determine the expansivity, $\eta$, of the sigmoid transform. Similar explanation as in main text. |
| 7  $\psi(i) = \frac{\eta}{1 + e^{-(\lambda V(i) + \phi)}} + 1$ | Apply sigmoidal transform to each unit. Similar explanation as in main text |
| 8  $\rho(i) = \frac{\psi(i)}{\Sigma_{k \in CM} \psi(k)}$ | Normalize relative likelihoods ($\psi$) to final probabilities ($\rho$) of winning. |
| 9 | Select final winner in each WTA CM according to $\rho$-distribution in that CM. See Step 9 of CSM-2 for details regarding how many winners to draw from the $\rho$-distribution in each CM, for the various cases of overcode and chunk code. |

3. Exemplary Usages

The method described herein allows the formation of compact binary (e.g., digital) representations of digitally encoded input sequences based on observing each frame only once. Therefore, the method of the invention has broad utility in many fields.

Merely to illustrate, the method can be used to form representations of a set of suitably-preprocessed videos, where each video is a sequence of frames, enabling efficient fully-automated, content-based search and retrieval from that set. Given a retrieval cue (query) that is itself a similarly pre-processed video snippet, the most similar stored video is returned. The method's similarity metric is a spatiotemporal metric; i.e., it depends on the temporal evolution of visual features, objects, etc. over the course of the videos, not just on what features, objects, etc., are present.

The method of the invention can also be used to form representations of a set of suitably-preprocessed audio snippets, where each audio snippet is a discrete sequence of digital frames, each representing a short period of sound, e.g., speech, music, enabling automatic, content-based search and retrieval from that set. Given a query that is itself a similarly pre-processed audio snippet, the most similar stored audio is returned.

During the learning period in which the representations of the set of audio snippets are formed, if related, also suitably-preprocessed, information (tags), e.g., the name of the artist performing in the snippet, name of the song, names of the instruments features, song's genre, etc., is presented along with the snippets, then subsequent presentation of an audio snippet as a query will return these associated tag items.

The method of the invention can further be used to form representations of a digitally encoded set of texts, such that when subsequently prompted with a unique portion of any of the encoded texts (or a text that is sufficiently similar to a portion of the encoded texts), the portion of the text containing the prompt, that follows the prompt, will be returned.

The method can also be used to form representations of corpus of digitally encoded biosequence data (such as nucleotide or amino acid sequences), such that when subsequently prompted with a similarly encoded biosequence snippet, it returns the most similar stored sequence, or the most similar portion (most likely homologous portion) of any of the stored sequences.

Following the storage of any appropriately preprocessed sequential data using the methods of the invention, given a similarly preprocessed query sequence, the invention further provides methods for retrieving the most similar stored sequence or the most similar portion of any stored sequence, by searching the stored sequences of items using the query sequence.

In certain embodiments, the methods of the invention are carried out by a computer or other similar physical devices, such as those specifically programmed to carry out one or more specific step(s) of the invention. One of skill in the art would be readily able to adapt any general purpose computer to specifically carry out the step(s) of the invention.

In a related aspect, the invention further provides a computer system or a network of computers that implements the subject method, that is specially built and/or programmed to carry out the steps of the methods as described herein.

All embodiments or features of the invention described herein are contemplated to be able to combine with any other embodiments or features where applicable.

REFERENCES (ALL INCORPORATED HEREIN BY REFERENCE)

1. G. A. Miller, *Psychological Review* 63, 81 (1956).
2. J. L. Elman, *Cognitive Science: A Multidisciplinary Journal* 14, 179 (1990).
3. M. I. Jordan, "Serial Order: A Parallel Distributed Processing Approach" (Univ. Cal. San Diego, 1986).
4. A. D. de Groot, F. Gobet, in *Heuristics of the Professional Eye*. (Van Gorcum, 1996).
5. E. A. Feigenbaum, H. A. Simon, *Cognitive Science* 8, 305 (1984).
6. A. Newell, *Unified theories of cognition*. (Harvard University Press, Cambridge, Mass., 1990).
7. Y. Agam, D. Bullock, R. Sekuler, *J Neurophysiol* 94, 2832 (Oct. 1, 2005, 2005).
8. D. W. Glasspool, G. Houghton, *Brain and Language* 94, 304 (2005).
9. G. Houghton, in *Current research in natural language generation*, R. Dale, C. Mellish, M. Zock, Eds. (Academic Press Professional, 1990), pp. 287-319.
10. S. Grossberg, in *Pattern recognition by humans and machines*, Vol. 1: Speech perception E. C. Schwab, H. C. Nusbaum, Eds. (Academic Press, New York, 1986), pp. 187-294.
11. G. Bradski, G. Carpenter, A., S. Grossberg, *Biological Cybernetics* 71, 469 (1994).
12. J. McClelland, L., D. Rumelhart, E., *Psychological review* 88, 375 (1981).
13. A. Waibel, T. Hanazawa, G. Hinton, K. Shikano, K. Lang, *IEEE Transactions on Acoustics, Speech, and Signal Processing* 37, 328 (1989).
14. D. Kleinfeld, *PNAS USA* 83, 9469 (1986).
15. J. J. Hopfield, C. D. Brody, *PNAS* 98, 1282 (Jan. 30, 2001, 2001).
16. R. M. French, *Trends in Cognitive Sciences* 3, 128 (April, 1999).
17. D. O. Hebb, *The organization of behavior*. (Wiley, N.Y., 1949).
18. A. Knoblauch, G. Palm, F. T. Sommer, *Neural Computation* 22, 289 (2010).
19. M. Moll, R. Miikkulainen, "Convergence-Zone Episodic Memory: Analysis and Simulations" *Tech. Report AI95-227* (University of Texas at Austin, Dept. of Computer Science, 1995).
20. G. Palm, *Neural assemblies: An alternative approach to artificial intelligence*. (Springer, Berlin, 1982).
21. G. Rinkus, Boston University (1996).
22. D. J. Willshaw, O. P. Buneman, H. C. Longuet-Higgins, *Nature* 222, 960 (1969).

The entire content of the figures, including all texts therein, are incorporated herein by reference, and thus constitute a part of the specification.

The invention claimed is:

1. A computer-implemented method for encoding one sequence of items, out of a plurality of similar sequences of items, in a distributed representation (DR), the method comprising:
   (1) from a plurality of representation units, activating and associating a selected subset of representation units upon presentation of the first item of the sequence of items to generate a plurality of active representation units associated with the first item;
   (2) upon presentation of the next item of the sequence of items, deactivating and disassociating a subset of active representation units; and,
   (3) repeating step (2), for each successive item of the sequence of items presented (if any),
wherein the method only deactivates and dissociates active representation units; and, wherein the remaining set of active representation units is the DR that encodes said one sequence of items.

2. The computer-implemented method of claim 1, wherein the DR is a sparse distributed representation (SDR), and wherein the ratio of active representation unit/total representation unit is no more than 1/2, 1/3, 1/5, 10%, 1%, 0.1%, 0.05%, or 0.01%.

3. The computer-implemented method of claim 1, wherein each item in said sequence of items represent a data value, a number, a letter, a character, a symbol, a video frame, an audio signal, a digitally encoded text, a time sequence, a letter or symbolic representation of a nucleotide or amino acid, or a distributed representation for another sequence of items in a different layer.

4. The computer-implemented method of claim 1, wherein each of said plurality of representation units or said plurality of active representation units is a physical memory unit capable of adopting either an ON state (1) or an OFF state (0).

5. The computer-implemented method of claim 1, wherein the degree of connectivity for the connection matrix is less than 100%, 90%, 80%, or lower.

6. The computer-implemented method of claim 1, wherein the weight of each connection between the active representation units and the associated items has more than two states, and/or can be continuously valued.

7. The computer-implemented method of claim 1, wherein each representation units has more than two states, and/or can be continuously valued.

8. The computer-implemented method of 2, wherein the sparse distributed code is enforced by specifying the number or fraction of the representation units that may be activated at any time.

9. The computer-implemented method of 2, wherein the sparse distributed code is enforced by organizing an internal coding layer into winner-take-all (WTA) competitive modules (CMs), and by specifying the number or fraction of the CMs that may be activated at any time.

10. The computer-implemented method of 9, wherein the number of representation units per CM varies either within or across layers or both.

11. A computer-implemented method for retrieving a distributed representation (DR) that encodes a query sequence of items, the method comprising:
  (1) from a plurality of distributed representations (DRs), each encoding a candidate sequence of items, activating a selected subset of DRs compatible with a presented item or a presented sub-sequence of items of said query to generate one or more active DRs;
  (2) presenting additional item(s) or additional sub-sequence of items of the query, and deactivating, from the plurality of active DRs, active DRs that are incompatible with the additional item(s) or additional sub-sequence of items that have been presented thus far; and,
  (3) repeating step (2), for further additional item(s) or further additional sub-sequence of items of said query,
wherein the method only deactivates active DRs; and,
wherein the remaining set of active DR units encodes said query sequence of items.

12. The computer-implemented method of claim 11, wherein said presented item is the first item of the query.

13. The computer-implemented method of claim 11, wherein said presented sub-sequence of items is the first two items of the query, two or more consecutive internal items of the query, or an initial portion of the query of any length up to and including the whole query sequence.

14. The computer-implemented method of 11, wherein the DR is a sparse distributed code, and wherein the sparse distributed code is enforced by specifying the number or fraction of the representation units that may be activated at any time.

15. The computer-implemented method of 11, wherein the DR is a sparse distributed code (SDR), and wherein the SDR is enforced by organizing the layer into WTA CMs, and by specifying the number or fraction of the CMs that may be activated at any time.

16. A computer-implemented method having multiple layers, each using the method of claim 1, wherein distributed representations (DRs) at each higher layer encode sequences of items at the immediate lower layer, which sequences of items are DRs at said immediate lower layer that encode sequences of items at the next lower layer.

17. The computer-implemented method of claim 16, wherein the first paring event at each higher layer occurs after the first paring event at its immediate lower layer.

18. The computer-implemented method of claim 16, wherein the representation units of an internal layer have additional connection matrices that connect them to representation units of other layers or entities.

19. A computer system for encoding one sequence of items, out of a plurality of similar sequences of items, in a distributed representation (DR), the system comprising:
  (1) a plurality of representation units, wherein at least a selected subset of said plurality of representation units, upon presentation of the first item of the sequence of items, are programmed to be (or are capable of being) activated and associated with said first item to generate a plurality of active representation units associated with the first item; and,
  (2) a mechanism (or means) for deactivating and disassociating, from the plurality of active representation units, active representation units that are incompatible with the sequence of items that has been presented thus far, upon presentation of the next item of the sequence of items;
wherein the mechanism or means only deactivates and dissociates active representation units that are incompatible with the sequence of items that has been presented thus far.

* * * * *